(12) United States Patent
Tanaka et al.

(10) Patent No.: US 8,542,896 B2
(45) Date of Patent: Sep. 24, 2013

(54) MEDICAL IMAGE PROCESSING DEVICE AND MEDICAL IMAGE PROCESSING METHOD

(75) Inventors: Shino Tanaka, Tokyo (JP); Takashi Shirahata, Tokyo (JP); Takayuki Kadomura, Tokyo (JP); Tetsuo Nakazawa, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 234 days.

(21) Appl. No.: 13/124,452

(22) PCT Filed: Oct. 20, 2009

(86) PCT No.: PCT/JP2009/068055
§ 371 (c)(1),
(2), (4) Date: May 23, 2011

(87) PCT Pub. No.: WO2010/047324
PCT Pub. Date: Apr. 29, 2010

(65) Prior Publication Data
US 2011/0228994 A1 Sep. 22, 2011

(30) Foreign Application Priority Data
Oct. 20, 2009 (JP) .................................. 2008-269360

(51) Int. Cl.
*G06K 9/00* (2006.01)

(52) U.S. Cl.
USPC .............................. 382/128; 128/922; 378/4

(58) Field of Classification Search
USPC ................. 382/100, 128, 129, 130, 131, 132, 382/181, 190, 195, 203; 128/922; 378/4–27
See application file for complete search history.

(56) References Cited

U.S. PATENT DOCUMENTS

| | | | | |
|---|---|---|---|---|
| 6,418,238 | B1* | 7/2002 | Shiratani et al. | 382/133 |
| 6,470,092 | B1* | 10/2002 | Li et al. | 382/132 |
| 7,564,998 | B2* | 7/2009 | Tsujii | 382/128 |
| 7,609,910 | B2* | 10/2009 | Geiger et al. | 382/276 |
| 8,023,710 | B2* | 9/2011 | Summers et al. | 382/131 |
| 2005/0002548 | A1* | 1/2005 | Novak et al. | 382/128 |
| 2005/0207630 | A1* | 9/2005 | Chan et al. | 382/131 |

(Continued)

FOREIGN PATENT DOCUMENTS

| | | |
|---|---|---|
| JP | 8-249492 | 9/1996 |
| JP | 2000-51207 | 2/2000 |

(Continued)

OTHER PUBLICATIONS

International Search Resort in PCT/JP2009/068055.

*Primary Examiner* — Anand Bhatnagar
(74) *Attorney, Agent, or Firm* — Cooper & Dunham LLP

(57) ABSTRACT

There is provided a medical image processing device and a medical image processing method that can extract and display lesion candidate regions having different sizes and similarity forms at a time through a series of processing. Therefore, with respect to a first medical image, a first evaluation for the curved surface form of the first medical image is made to extract first lesion candidate regions. With respect to each of the first lesion candidate regions extracted by a first extracting unit, a second evaluation for the curved surface form thereof is made to extract a second lesion candidate region. The second lesion candidate region extracted by a second extracting unit is superimposed and displayed on a second medical image.

15 Claims, 25 Drawing Sheets

(56) References Cited

U.S. PATENT DOCUMENTS

| | | | |
|---|---|---|---|
| 2005/0259854 A1* | 11/2005 | Arimura et al. | 382/130 |
| 2007/0172103 A1* | 7/2007 | Kadomura et al. | 382/131 |
| 2008/0002870 A1* | 1/2008 | Farag et al. | 382/128 |
| 2009/0097730 A1 | 4/2009 | Kasai et al. | |

FOREIGN PATENT DOCUMENTS

| | | |
|---|---|---|
| JP | 2006-230910 | 9/2006 |
| JP | 2006-280713 | 10/2006 |
| JP | 2006-346094 | 12/2006 |
| JP | 2007-14483 | 1/2007 |
| JP | 2007-151645 | 6/2007 |

* cited by examiner

F I G . 2
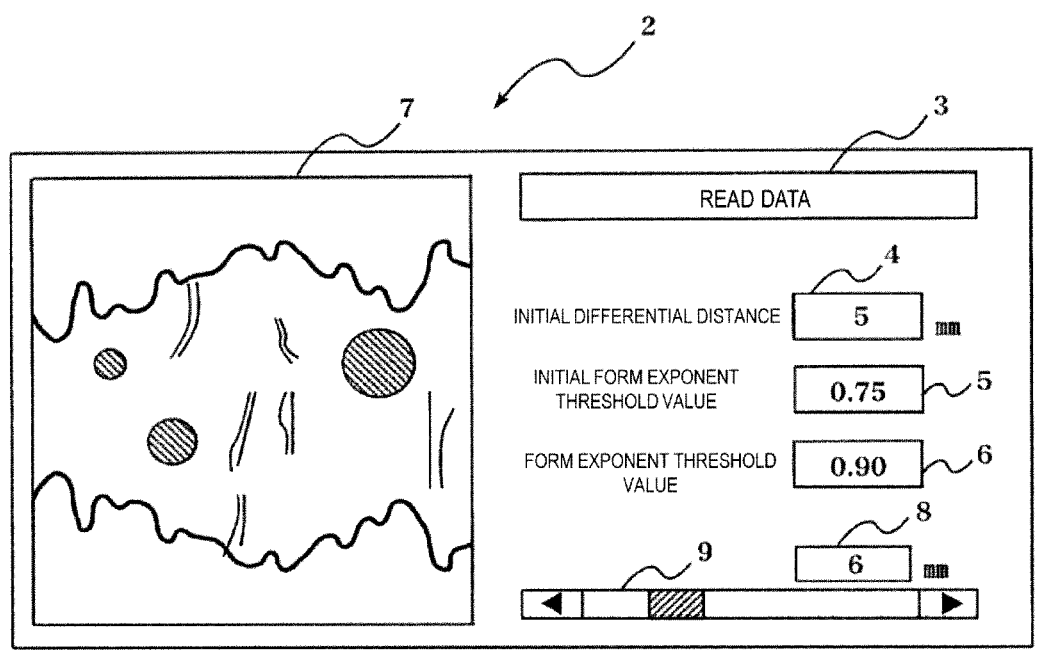

F I G . 4
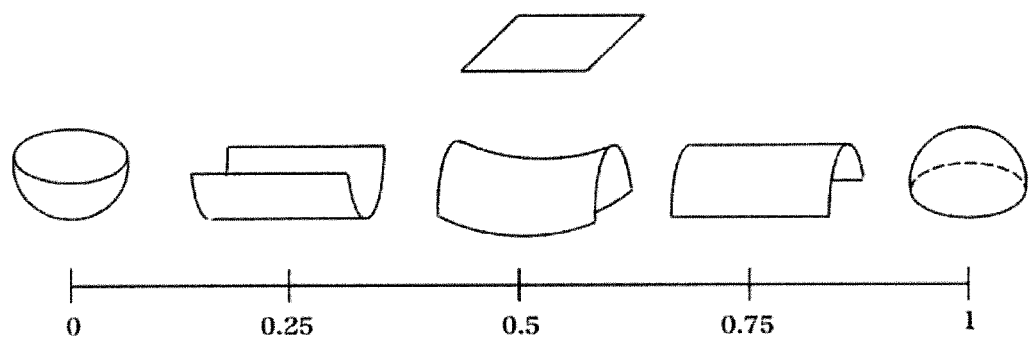

F I G . 5
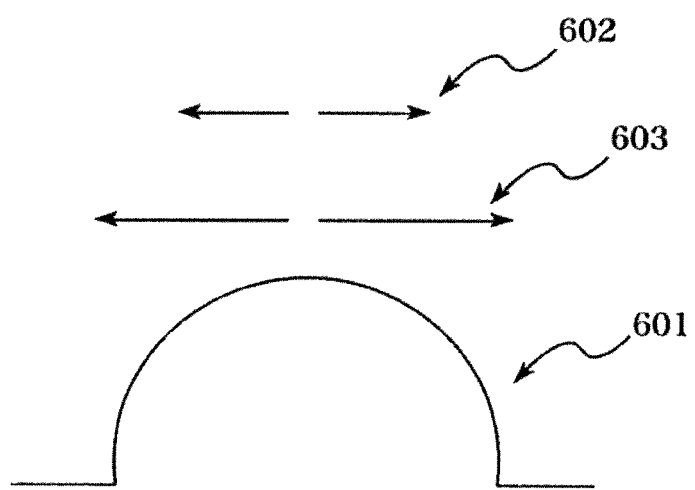

F I G . 6
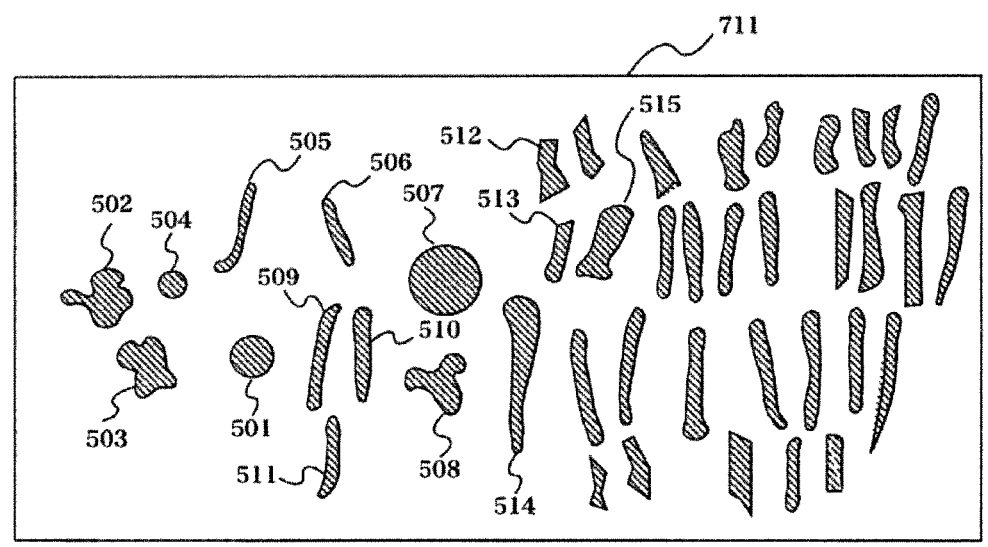

F I G . 8
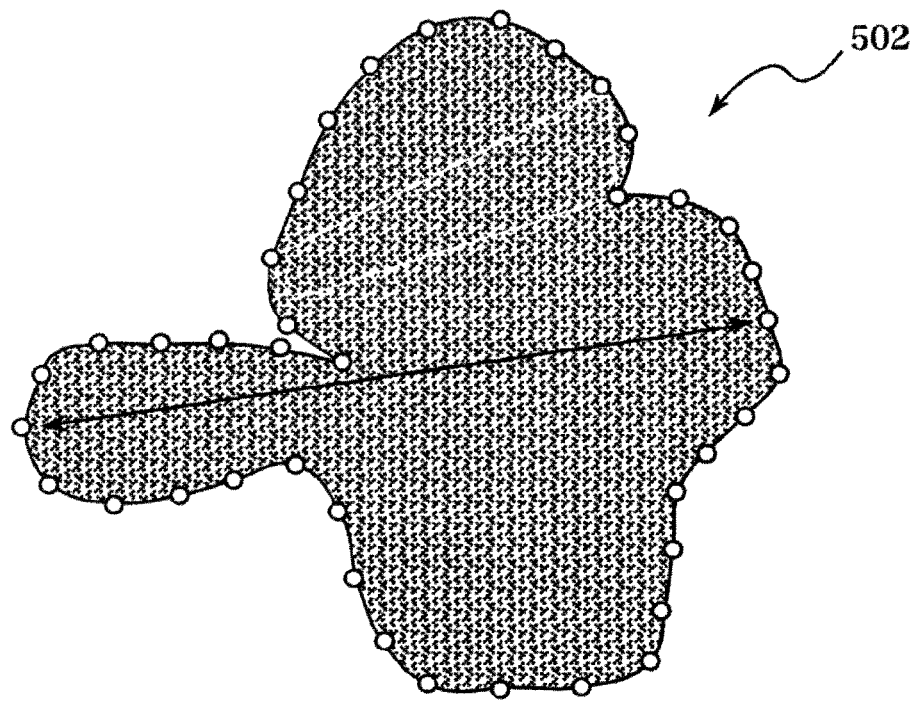

F I G . 1 1
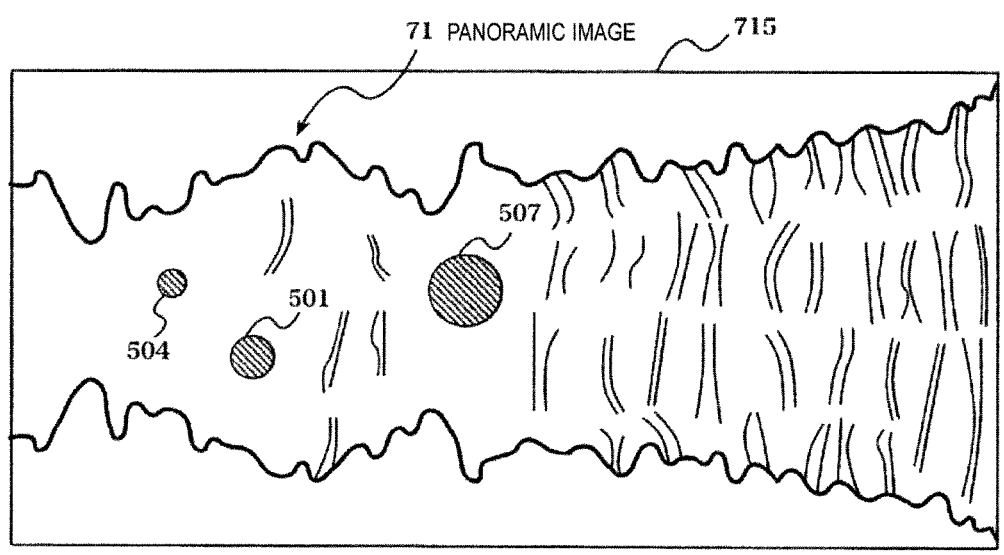

FIG. 12
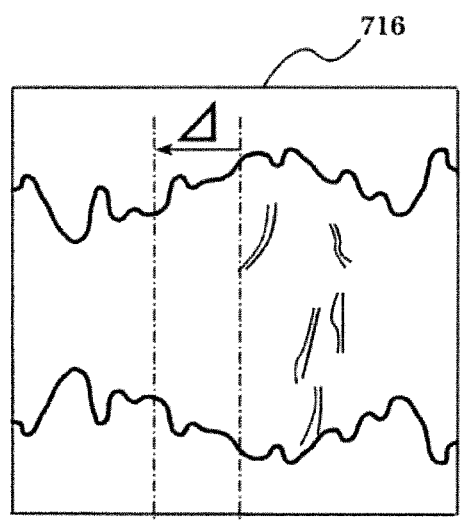
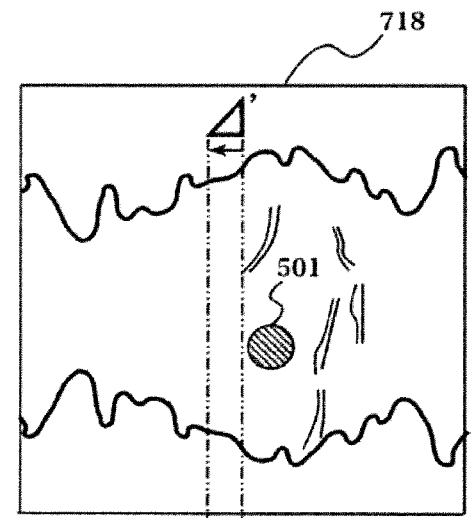
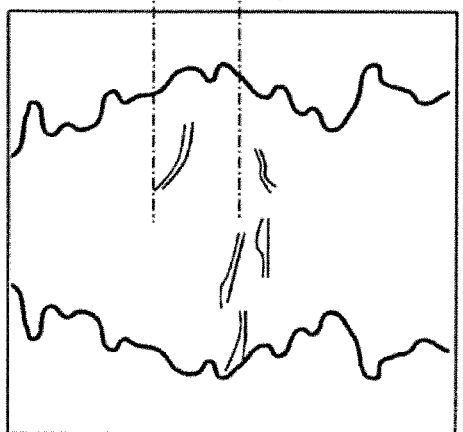
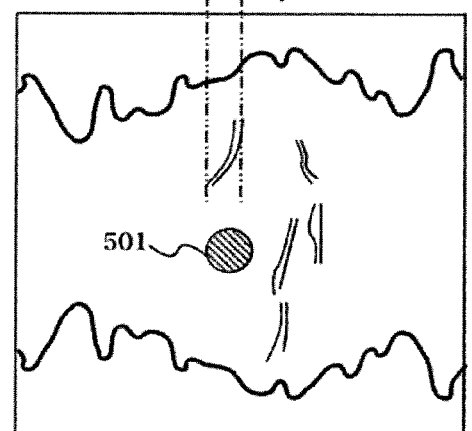

F I G . 1 5
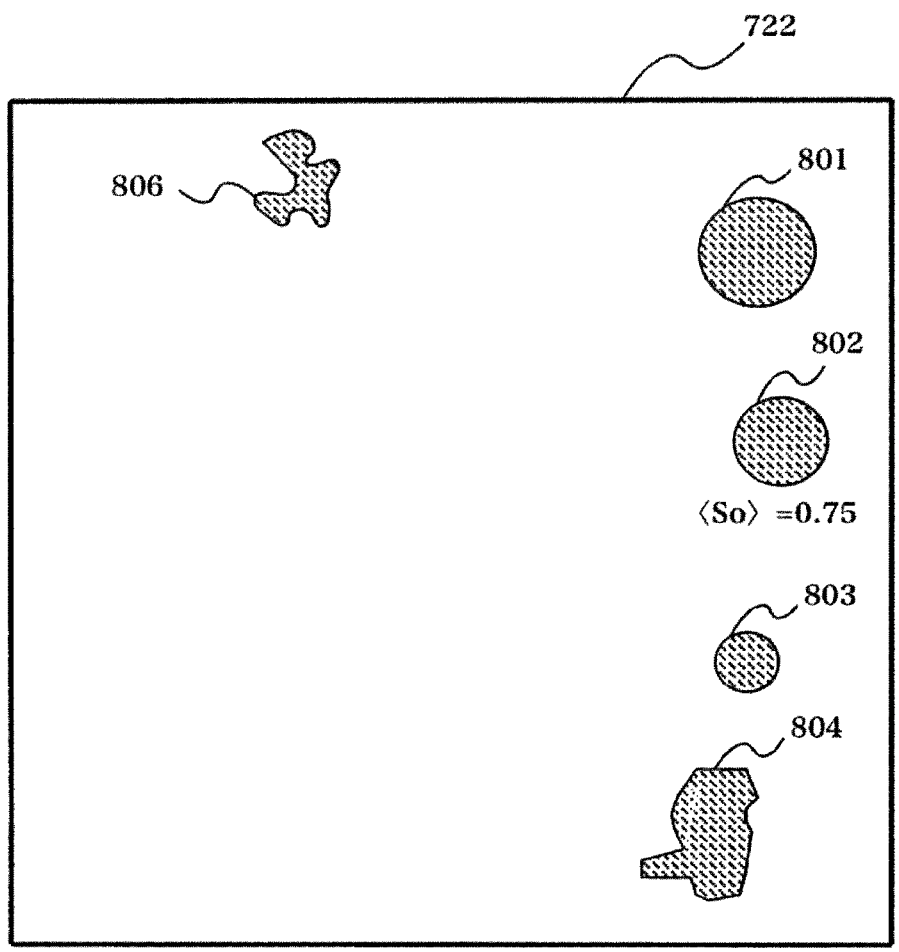

F I G. 1 6
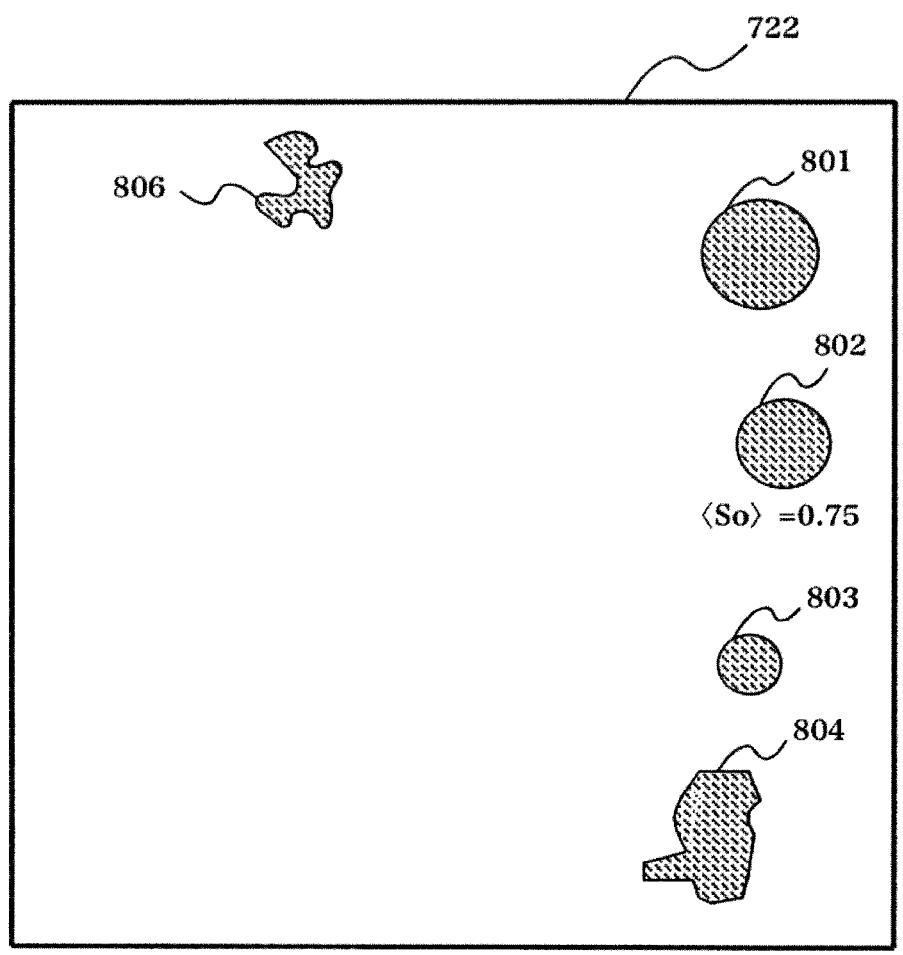

FIG. 21
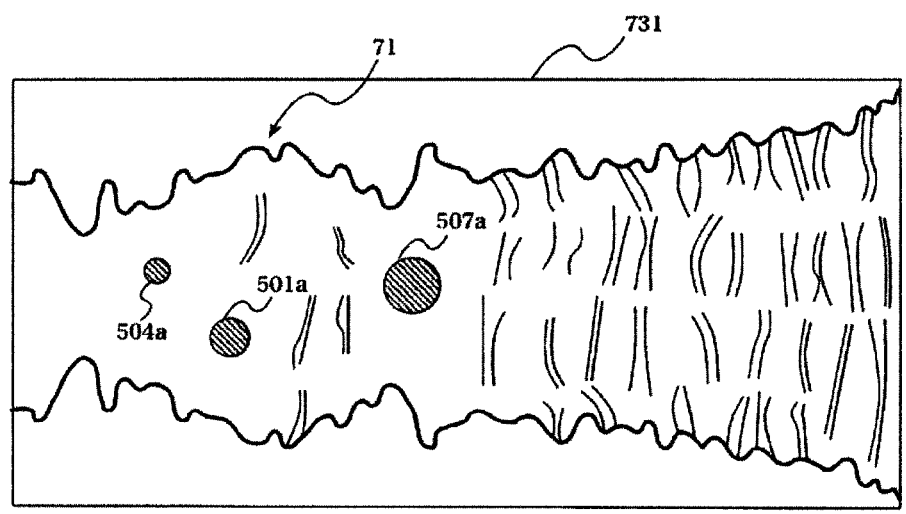
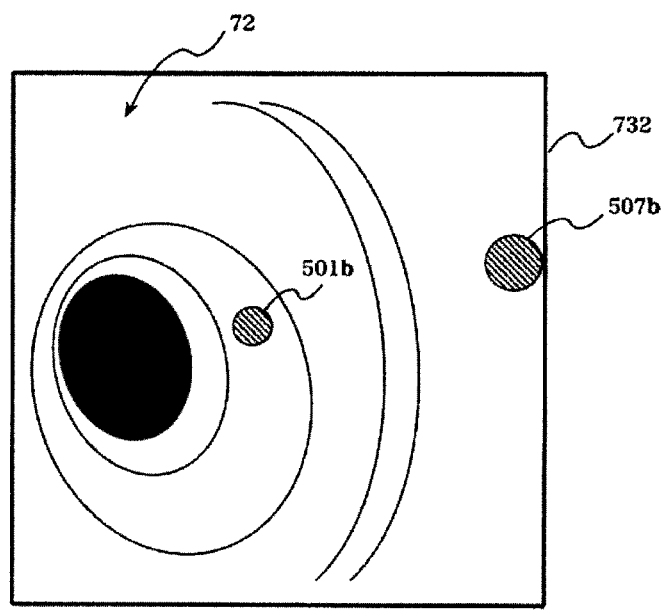

FIG. 23
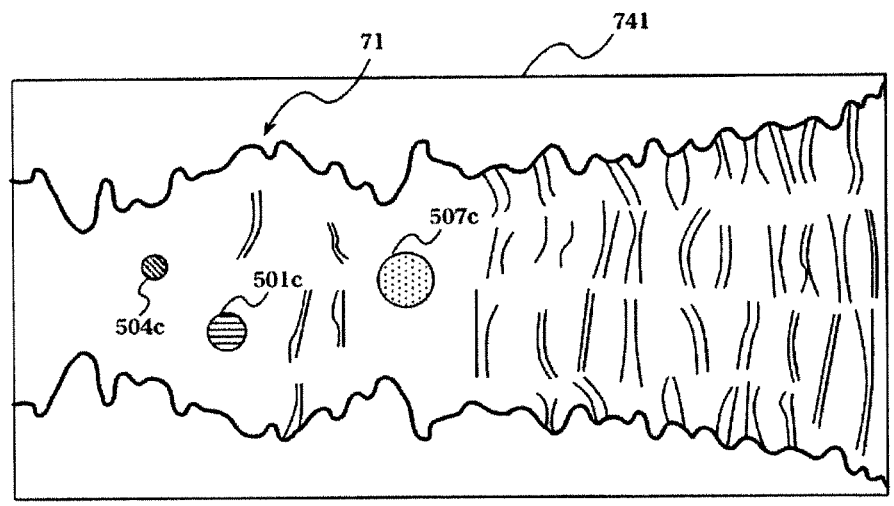
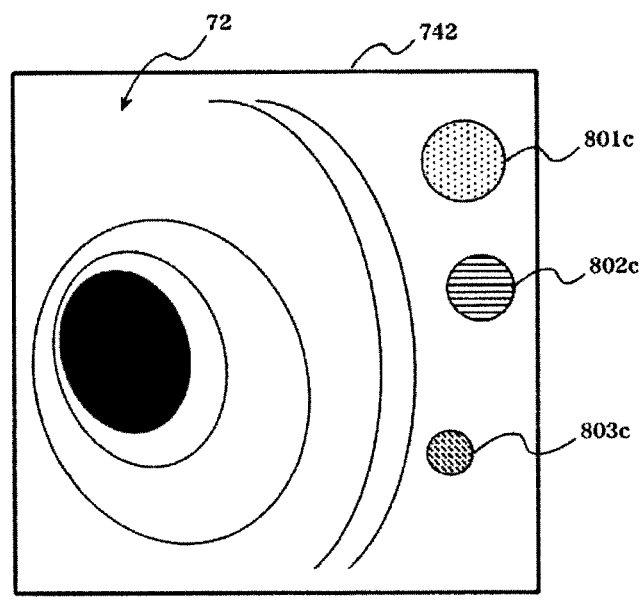

FIG. 24
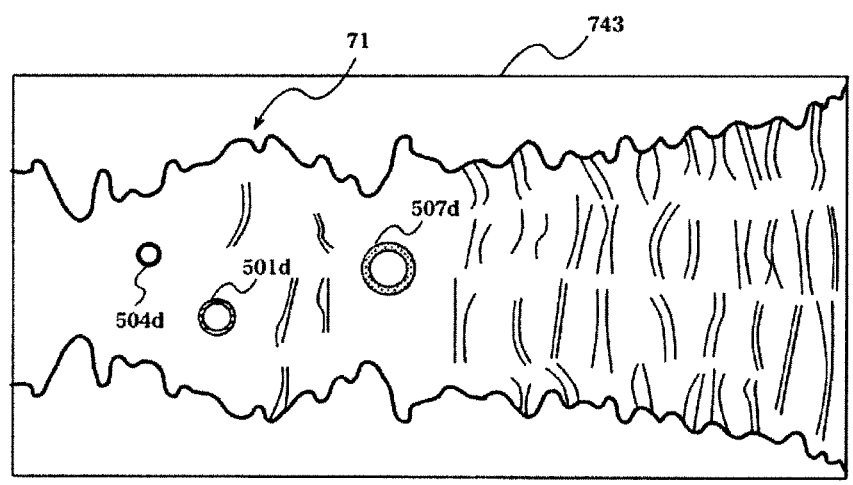
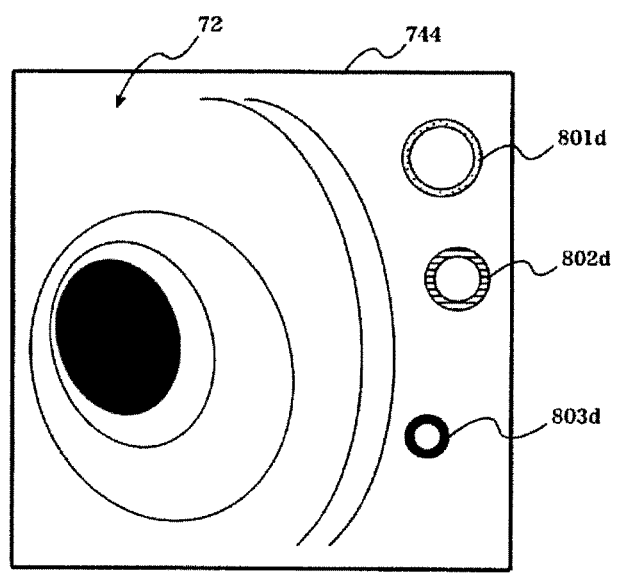

F I G . 2 5
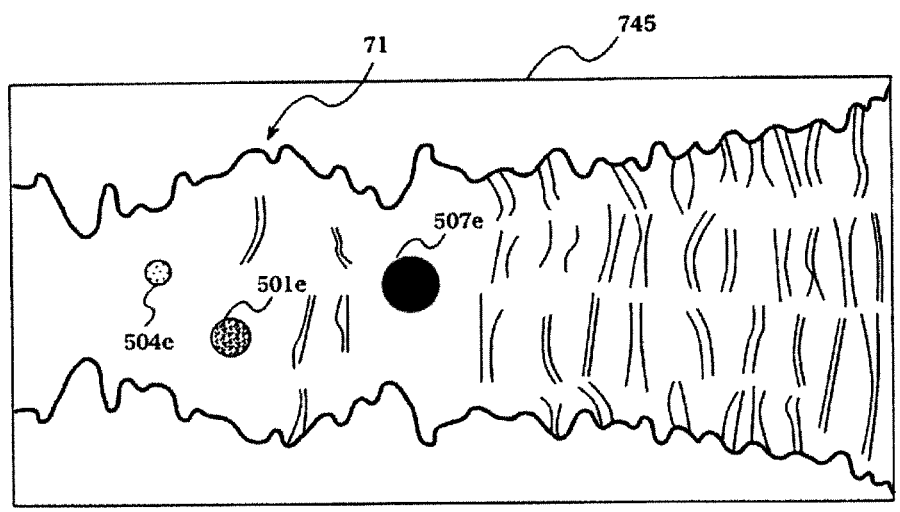
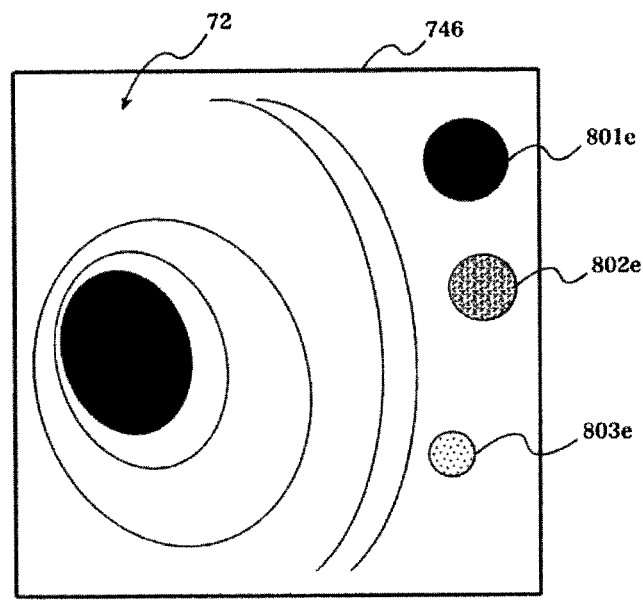

MEDICAL IMAGE PROCESSING DEVICE AND MEDICAL IMAGE PROCESSING METHOD

TECHNICAL FIELD

The present invention relates to a medical image processing device for extracting and displaying lesion candidates on the basis of a medical image.

BACKGROUND ART

Tomographic images, etc. of an examinee which are scanned by an X-ray CT (Computed Tomography) apparatus, an MRI (Magnetic Resonance Imaging) apparatus, an ultrasonic apparatus, etc. have been hitherto known as images used for medical diagnosis. There has been developed a computer-aided detection apparatus (Computer-Aided Detection; hereinafter referred to as CAD) in which a medical image as described above is analyzed by using a computer to detect lesion candidates from shade and shadow of the medical image and present the lesion candidates to a medical doctor. CAD automatically detects an image region estimated as a lesion site (hereinafter referred to as lesion candidate region) on the basis of a form characteristic or a density characteristic of the lesion site, and it reduces a labor imposed on the medical doctor.

Furthermore, when a large number of cases are required to be read like health check or the like, there is an operator's requirement of extracting and displaying lesion candidates of plural desired sizes at a time through a series of processing to efficiently perform diagnosis. For example, polyps in a colon region have a characteristic feature, but have various sizes. In general, lesion candidates as medical treatment targets are equal to 5 mm or more in size, and lesion candidates of 10 mm or more have a high risk that they become colon cancers. For example, Patent Document 1 discloses a method of extracting lesion candidates by making an evaluation using a feature amount representing the form of a curved surface (shape index) for a medical image.

PRIOR ART DOCUMENT

Patent Document

Patent Document 1: JP-A-2006-230910

SUMMARY OF THE INVENTION

Problem to be Solved by the Invention

However, when lesion candidates as extraction targets are different from one another in size, the optimum value of a parameter for calculating the feature amount representing the form (form exponent; for example, shape index) is different among them. Therefore, the conventional method has a disadvantage that even lesion candidates representing the same form cannot be extracted and displayed at a time through a series of processing when they are different from one another in size.

The present invention has been implemented in view of the foregoing problem, and has an object to provide a medical image processing device and a medical image processing method that can extract and display lesion candidates having similarity forms and different sizes at a time through a series of processing.

Means of Solving the Problem

In order to attain the above object, according to a first invention, a medical image processing device for extracting and displaying lesion candidate regions from a medical image is characterized by comprising: a first extracting unit that makes a first evaluation of a curved surface form for a first medical image to extract a first lesion candidate region; a second extracting unit that makes a second evaluation of a curved surface form for each first lesion candidate region extracted by the first extracting unit to extract a second lesion candidate region; and a display unit that displays the second lesion candidate region extracted by the second extracting unit while the second lesion candidate region is superimposed on a second medical image.

According to a second invention, a medical image processing method for extracting and displaying lesion candidate regions from a medical image is characterized by comprising: a first extracting step that makes a first evaluation of a curved surface form for a first medical image to extract a first lesion candidate region; a second extracting unit that makes a second evaluation of a curved surface form for each first lesion candidate region extracted by a first extracting unit to extract a second lesion candidate region; and a display unit that displays the second lesion candidate region extracted by a second extracting unit while the second lesion candidate region is superimposed on a second medical image.

Effect of the Invention

According to this invention, there can be provided the medical image processing method and the medical image processing device that can extract and display lesion candidates having similarity forms and different sizes at a time through a series of processing.

BRIEF DESCRIPTION OF THE DRAWINGS

FIG. 2 shows an example of GUI 2 used when lesion candidate extraction processing is executed.

FIG. 4 is a diagram showing a form exponent (Shape Index).

FIG. 5 is a diagram showing a differential distance.

FIG. 6 is a diagram showing an example of a lesion candidate region extracted at the stage of step S107 of FIG. 3.

FIG. 8 is a diagram showing calculation of a region size.

FIG. 11 shows an example of a superimposed image obtained by superimposing a lesion candidate region on a panoramic image.

FIG. 12 is a diagram showing a slide display in a hollow organ core line direction.

FIG. 15 is a diagram showing an example of a lesion candidate region extracted at the stage of step S208 of FIG. 13.

FIG. 16 is a diagram showing an example of a lesion candidate region extracted at the stage of step S213 of FIG. 13.

FIG. 21 shows a display example according to the third embodiment.

FIG. 23 shows an example of a display format of a lesion candidate region.

FIG. 24 shows an example of the display format of the lesion candidate region.

FIG. 25 shows an example of the display format of the lesion candidate region.

BEST MODES FOR CARRYING OUT THE INVENTION

Preferable embodiments according to the present invention will be described in detail with reference to the accompanying drawings.

First Embodiment

First, the construction of an image processing system 1 to which a medical image processing device according to the present invention is applied will be described.

Figure 1:
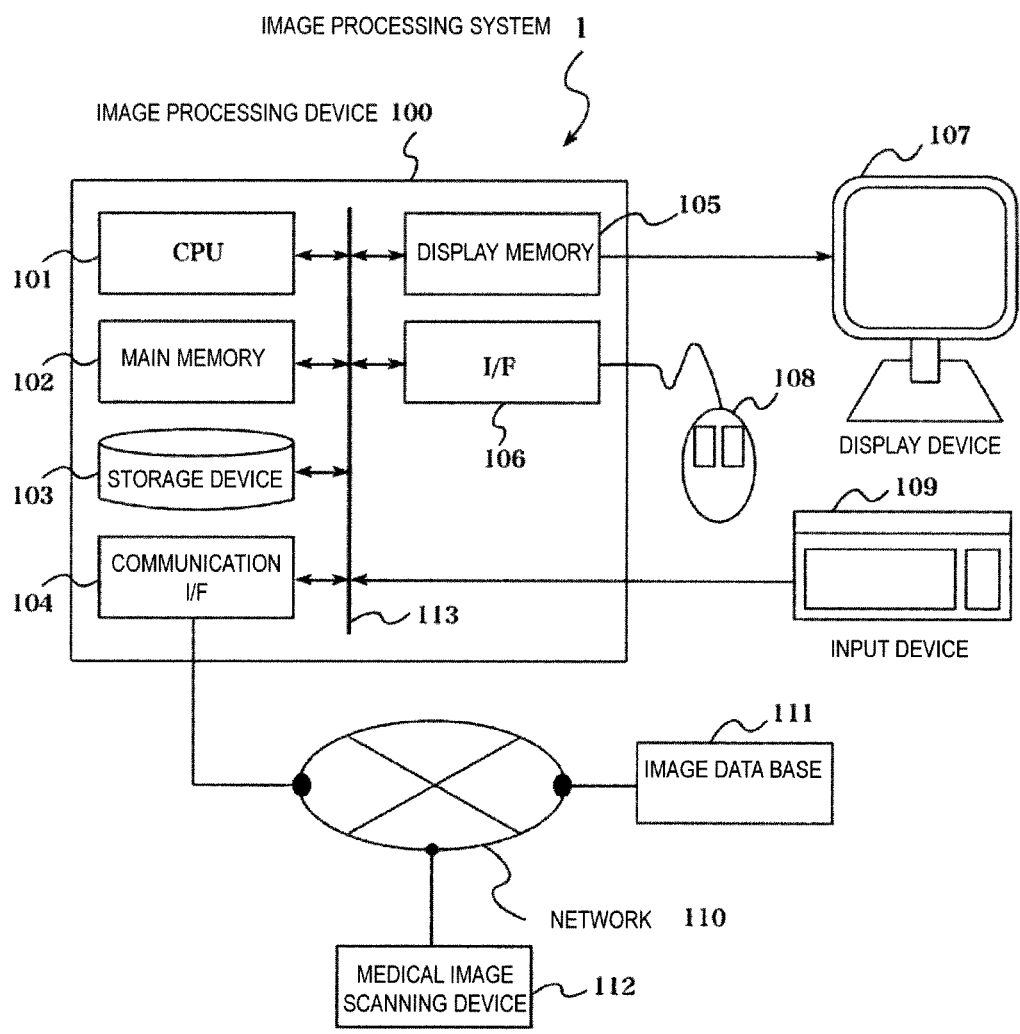
FIG. 1 is a hardware construction diagram showing the overall construction of an image processing system 1.

As shown in FIG. 1, the image processing system 1 includes a medical image processing device 100 having a display device 107 and an input device 109, and an image data base 111 and a medical image scanning device 112 which are connected to the medical image processing device 100 through a network 110.

The medical image processing device 100 is a image diagnosing computer installed in a hospital or the like, and it functions as a computer-aided detection device (CAD) for analyzing a medical image, detecting a lesion candidate (s) from shade and shadow of the medical image and presenting the lesion candidate (s) to a medical doctor. The medical image processing device 100 has CPU 101 (Central Processing Unit) 101, a main memory 102, a storage device 103, a communication interface (communication I/F) 104, a display memory 105, and an interface (I/F) 106 with external equipment such as a mouse 108 or the like, and the respective parts are connected to one another through a bus 113.

CPU 101 calls up a program stored in the main memory 102, the storage device 103 or the like into a work memory area on RAM of the main memory 102 to execute the program, and controls the operation of the respective parts connected through the bus 113 to implement various kinds of processing executed by the medical image processing device 100.

Furthermore, CPU 101 executes processing described later concerning extraction of a lesion candidate region in the first embodiment (see FIG. 3).

The main memory 102 comprises ROM (Read Only Memory), RAM (Random Access Memory), etc. ROM permanently holds programs such as a boot program of the computer, programs such as BIOS, etc., data, etc. RAM temporarily holds programs loaded from ROM, the storage device 103, etc., data, etc. and has a work area which is used to perform various kinds of processing by CPU 101.

The storage device 103 is a storage device for reading/writing data from/into HDD (hard disk drive) or another storage medium, and programs to be executed by CPU 101, data required to execute programs, OS (operating system), etc. are stored in the storage device 103. With respect to the programs, a control program corresponding to OS and application programs are stored. Program codes of these programs are read out by CPU 101 as occasion demands, shifted to RAM of the main memory 102 and executed as various kinds of means.

The communication I/F 104 has a communication control device, a communication port, etc., and mediates communications with the medical image processing device 100 and the network 110. The communication I/F 104 controls communication with the image data base 111, another computer or the medical image scanning device 112 through the network 110. I/F 106 is a port for connection to peripheral equipment, and transmits/receives data to/from the peripheral equipment. For example, input devices such as the mouse 108, etc. may be connected through I/F 106.

The mouse 108 indicates any position on a display screen by moving operation or operation of a button, a wheel or the like, and pushes a software switch, etc., and outputs the operation signal corresponding to the operation through I/F 106 to CPU 101. The display memory 105 is a buffer for temporarily accumulating display data input from CPU 101. The accumulated display data are output to the display device 107 at a predetermined timing.

The display device 107 comprises a display device such as a liquid crystal panel, a CRT monitor or the like, and a logic circuit for executing display processing in cooperation with the display device, and it is connected to CPU 101 through the display memory 105. Under the control of CPU 101, the display device 107 displays the display data accumulated in the display memory 105 on the display device.

The input device 109 is an input device such as a keyboard or the like and outputs to CPU 101 various kinds of instructions and information input by an operator such as ID information for specifying medical images, diagnosis reports of medical images displayed on the display device 107, etc., for example. The operator dialogically operates the medical image processing device 100 by using the external equipment such as the display device 107, the input device 109, the mouse 108, etc.

The network 110 contains various kinds of communication networks such as LAN (Local Area Network), WAN (Wide Area Network), Intranet, Internet, etc., and mediates communication connection between the image data base 111, a server, another information equipment or the like and the medical image processing device 100.

The image data base 111 accumulates and stores medical images scanned by the medical image scanning device 112, and it is provided to a server or the like in a hospital, a medical center or the like. In the image processing system 1 shown in FIG. 1, the image data base 111 is connected to the medical image processing device 100 through the network 110, however, the image data base 111 may be provided to the storage device 103 in the medical image processing device 100, for example.

The medical image scanning device 112 is an apparatus for picking up tomographic images of an examinee such as an X-ray CT apparatus, an MRI apparatus, an ultrasonic apparatus, a scintillation camera device, PET (Positron Emission Tomography) apparatus, SPECT (Single Photon Emission Computed Tomography) apparatus or the like, and it is connected to the image data base 111 or the medical image processing device 100 through the network 110.

Medical images handled by the image processing system 1 of this invention contain tomographic images, panoramic images of hollow organs and virtual endoscopic images of examinees. The panoramic image is obtained by displaying the inside of an internal organ so that the hollow organ is developed around the core line of the hollow organ (see FIG. 11), and the virtual endoscopic image is obtained by displaying the inside of the hollow organ according to a display method based on a central projection method from a virtual viewing point provided to the inside of the hollow organ (see FIG. 18).

Next, the operation of the image processing system 1 will be described with reference to FIGS. 2 to 12.

CPU 101 of the medical image processing device 100 reads out a program concerning lesion candidate extraction processing and data from the main memory 102, and executes the lesion candidate extraction processing on the basis of this program and the data.

When execution of the following lesion candidate extraction processing is started, it is assumed that image data are taken from the image data base 111 or the like through the network 110 and the communication I/F 104 and stored into the storage device 103 of the medical image processing device 100. Furthermore, when an execution start instruction of the lesion candidate extraction processing is input from the input device 109 or the like, for example, GUI 2 shown in FIG. 2 is read out from the storage device 106 and displayed on the display device 107.

GUI 2 shown in FIG. 2 has various kinds of input frames for inputting various conditions, set values or instruction required when a lesion candidate region is extracted, and an image display region 7 for displaying an extraction result, etc. An operator can dialogically input various conditions, etc. by operating the input device 109, the mouse 108 or the like while referring to a content displayed on GUI 2.

On GUI 2 are displayed a data read-in button 3, an input frame 4 for inputting an initial differential distance, an input frame 5 for inputting an initial form exponent threshold value, an input frame 6 for inputting a form exponent threshold value, an image display region 7 for displaying various kinds of images such as a medical image as a target, an extraction result of the lesion candidate extraction region, etc., an input frame 8 for instructing and inputting the size of the lesion candidate region to be superimposed and displayed, a scroll bar 9 for varying a value to be input to the input frame 8, etc.

Figure 3:
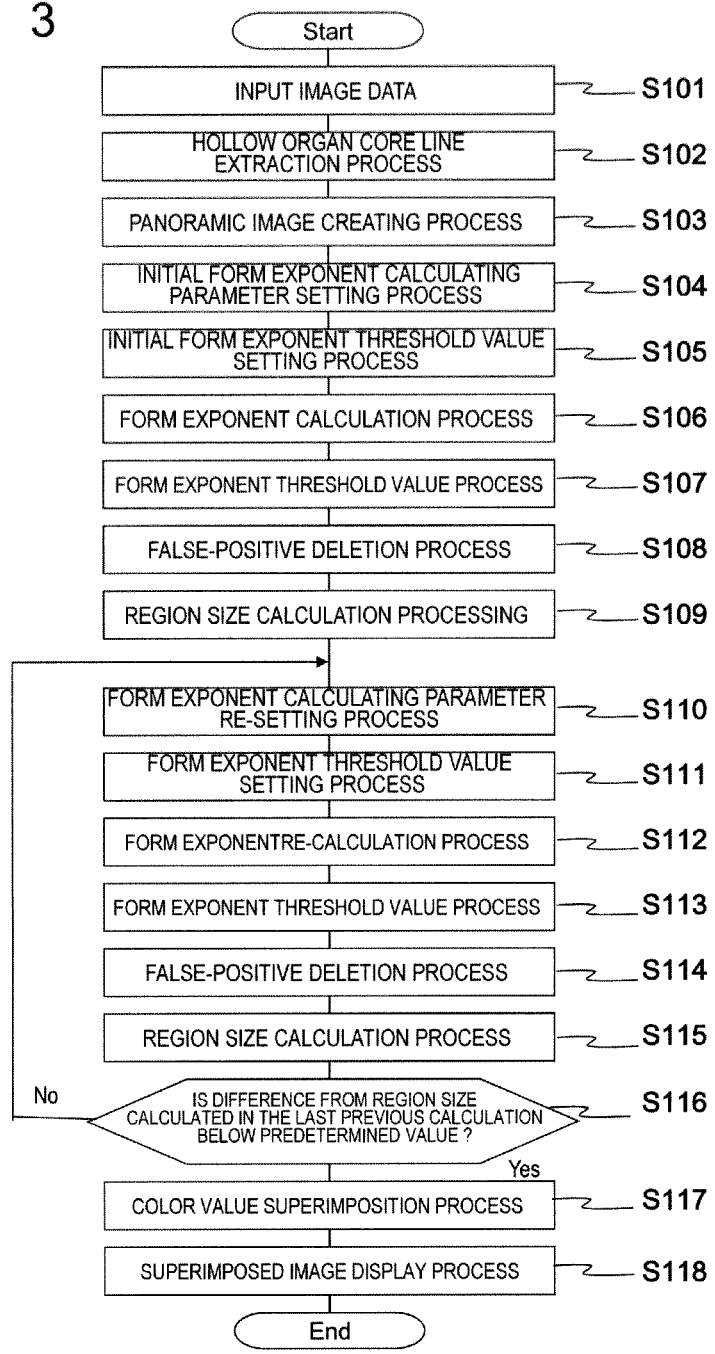
FIG. 3 is a flowchart showing the flow of lesion candidate extraction processing in a first embodiment.

In the lesion candidate extraction processing of FIG. 3, when the data read-in button 3 of GUI 2 of FIG. 2 is first clicked, CPU 101 executes the processing of reading image data. CPU 101 displays an image selection window on the display device 107 so that plural selection target images are displayed in a list or thumb nail display style on the image selection window, and accepts selection of an image from the operator. When the operator selects a desired image, CPU 101 reads out selected image data from the storage device 103 and holds the image data into the main memory 102 (step S101).

In this embodiment, it is assumed that image data of a hollow organ region such as a colon or the like are selected. Furthermore, the image data read at this stage are assumed as volume image data obtained by stacking plural tomographic images.

Subsequently, CPU 101 extracts a core line from the image data read in step S101 (step S102). As disclosed in JP-A-2006-42969, the extraction of the core line is performed by tracking a start point, a terminal point and passing points indicated in the hollow organ region of the displayed volume image data.

Subsequently, CPU 101 creates a display image by using core line information extracted in step S102. In this case, it is assumed that a panoramic image 71 is created as a display image (step S103; see FIG. 11). Details of the creation of the panoramic image 71 are disclosed in the Patent Document (U.S. Pat. No. 3,627,066), and the description thereof is omitted.

Subsequently, CPU 101 sets a parameter P1 for calculating a form exponent S for the overall panoramic image 71 created in step S103 (step S104). Here, the form exponent S is an index for estimating the state of the curved surface of the image, and so-called Shape Index is used as an example. The form exponent S is represented by the following mathematical expression (1). The parameter P1 is, for example, a differential distance for calculating a differential value at a point of interest, and used when the form exponent S is calculated (see the following mathematical expression (3)). As the parameter P1, may be used a value which is empirically determined in advance or any numerical value input to the input frame 4 of GUI 2 of FIG. 2. CPU 101 stores the set parameter P1 into the main memory 102.

[Expression (1)]

$$S = \frac{1}{2} - \frac{1}{\pi}\arctan\left(\frac{\lambda_{max} + \lambda_{min}}{\lambda_{max} - \lambda_{min}}\right) \quad (1)$$

In the mathematical expression (1), λmax, λmin represent the maximum value and minimum value of a main curvature at each point on a curved surface, and they are calculated by the following mathematical expression (2).

[Expression 2]

$$\lambda_{max} \equiv \frac{1}{2}\left[f_{xx} + f_{yy} + \sqrt{(f_{xx} + f_{yy})^2 - 4(f_{xx}f_{yy} - f_{xy}f_{xy})}\right] \quad (2)$$

$$\lambda_{min} \equiv \frac{1}{2}\left[f_{xx} + f_{yy} - \sqrt{(f_{xx} + f_{yy})^2 - 4(f_{xx}f_{yy} - f_{xy}f_{xy})}\right]$$

In the mathematical expression (2), fxx, fyy, fxy represent secondary partial derivatives of f(x, y) at a pixel-of-interest p, and it is calculated according to the following mathematical expression (3) by using the coordinate (x, y) of the pixel-of-interest p and depth data f(x, y) at the pixel p. The depth data f(x, y) represents the distance on a three-dimensional coordinate from the surface of a hollow organ to the core line thereof at a coordinate (x, y) in a real space of each point (each pixel) of the wall of the hollow organ represented as a panoramic image. The depth data f (x, y) is generated when the panoramic image 71 is created.

[Expression 3]

$$fxx = \frac{f(x+P1, y) + f(x-P1, y) - 2f(x,y)}{P1^2} \quad (3)$$

$$fyy = \frac{f(x, y+P1) + f(x, y-P1) - 2f(x,y)}{P1^2}$$

$$fxy = \frac{f(x+P1, y+P1) - f(x-P1, y+P1) - f(x+P1, y-P1) + f(x-P1, y-P1)}{P1^2}$$

As shown in FIG. 4, the Shape Index (form exponent S) has a value which continuously varies from 0 to 1, and different curved surface states correspond to the respective values. That is, a concave hemisphere corresponds to a value "0" of shape Index, and the value of Shape Index represents a concaved semicircular column, a saddle-shaped plane/flat plane, a convex semicircular column and a convex hemisphere in this order as the value of Shape Index increases from "0". The convex hemisphere corresponds to the value "1" of Shape Index.

When the form exponent S of a convex surface 601 shown in FIG. 5 is determined, the value of the form exponent S is dependent on the differential distance (parameter P1). The form exponent S has the maximum value when the differential distance is equal to the same level as the width of the curved surface (unevenness). When the differential distance is smaller than the width of the unevenness as indicated by an arrow 602 of FIG. 5, the form exponent S of a substantially planar surface is determined, and thus the form exponent S has a value in the neighborhood of "0.5". On the other hand, when the width of the unevenness and the differential distance are equal to the same level as indicated by an arrow 603 of FIG. 5, the gradient of the convex surface can be captured when a secondary derivative function is calculated. Therefore, the form exponent S has a value in the neighborhood of "1", and thus it represents that the form is close to the convex hemisphere.

As described above, the parameter P1 set in step S104 is used when the main curvature λmax, λmin are calculated, and thus the calculation result varies in accordance with the value of the parameter P1 even when the form exponent S for the same pixel is calculated.

In the lesion candidate extraction processing of the present invention, the form exponent S is repetitively calculated in a series of processing. In the following description, a form exponent S which is first calculated (step S106) is called as an initial form exponent $S_0$, and a form exponent which is calculated at a subsequent stage (step S112) is called as $S_n$ (n=1, 2, 3, ... ).

CPU 101 sets a threshold value for the initial form exponent $S_0$ (hereinafter referred to as initial form exponent threshold value) (step S105). As the initial form exponent threshold value may be used a value which is empirically determined in advance or any numerical value input to the input frame 5 of GUI 2 of FIG. 2. CPU 101 stores the set initial form exponent threshold value into the main memory 102. In this embodiment, since a convex lesion candidate (polyp) is extracted, it is assumed that the initial form exponent threshold value represents the lower limit value.

CPU 101 calculates the initial form exponent $S_0$ for each pixel of the panoramic image 71 created in step S103 by using the differential distance (parameter P1) set in step S104 (step S106).

CPU 101 executes threshold value processing on the form exponent $S_0$ calculated in step S106 by using the initial form exponent threshold value set in step S105 to extract a region falling into a threshold value range, and stores the region into the main memory 102 (step S107).

Specifically, CPU 101 sets, as lesion candidate regions, pixels having form exponents $S_0$ which are above the set initial form exponent threshold value. Through these stages, in order to roughly extract the lesion candidate regions, it is desired to set the initial form exponent threshold value set in step S105 to a relatively low value like "0.75", for example (see FIG. 2).

At this stage, some regions 501, 502, 503, . . . in the panoramic image are extracted like regions indicated by hatched lines of an image 711 of FIG. 6. With respect to a convex surface whose size remarkably exceeds the set parameter P1 (differential distance), the value of the calculated initial form exponent $S_0$ is smaller, so that it is set as an out-of-target of lesion candidate and thus it is not extracted. All the hatched regions in FIG. 6 are regions extracted in the processing of step S107, however, reference numerals of some regions in FIG. 6 are omitted.

With respect to each region extracted in step S107, CPU 101 calculates various kinds of feature amounts such as the degree of circularity, a major-axis/minor-axis ratio, etc. of the region. With respect to the calculated feature amounts, only regions falling into the preset threshold value range are extracted, and false-positive regions are deleted (step S108). The regions 501, 502, 503, 504, 507, 508, 512, 514 remaining at this stage are shown in FIG. 7.

Figure 7:
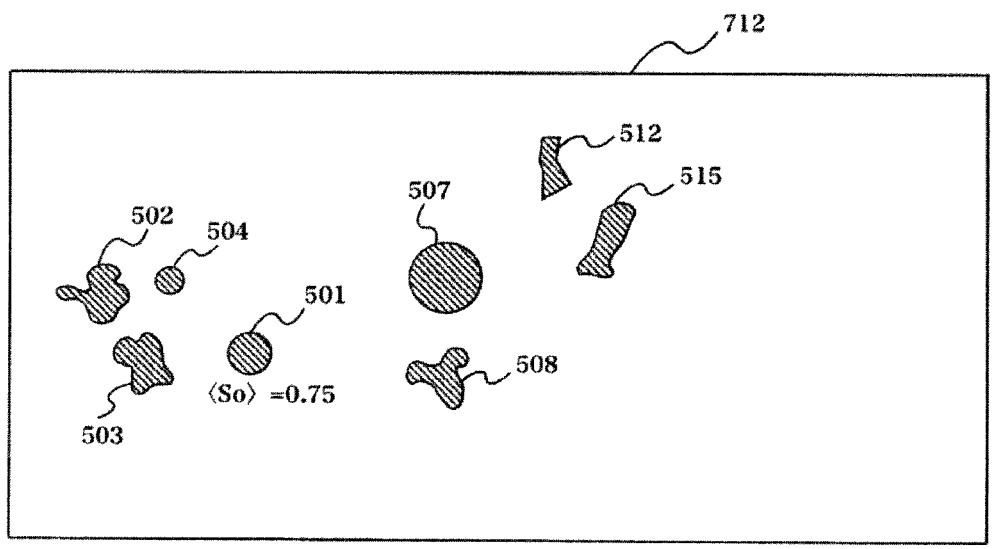
FIG. 7 is a diagram showing an example of a lesion candidate region extracted at the stage of step S108 of FIG. 3.

In the image 712 shown in FIG. 7, out of the extracted regions shown in FIG. 6, regions which are small in major-axis/minor-axis ratio and have forms relatively close to a circle are extracted. For example, an average value $<S_0>$ of the initial form exponents $S_0$ of the respective pixels in the region 501 of FIG. 7 is assumed to represent "0.75".

Subsequently, CPU 101 calculates the region size for each region extracted in step S108 (step S109). In the following description, a number i is affixed to an extracted lesion candidate region, the i-th lesion candidate region is referred to as a region i, and the region size of the region i is referred to as Li. The region size Li may be set to the maximum value of the distances among all the pixels belonging to the end (contour) of the region I, for example, as shown in FIG. 8. CPU 101 holds the region size Li calculated for each region i into the main memory 102.

Subsequently, CPU 101 resets a parameter di for each lesion candidate region extracted in step S108 by using the region size Li calculated in step S109, and holds the parameter di into the main memory 102 (step S110). The parameter di is a differential distance used to re-calculate the form exponent $S_n$, and it is calculated according to the following mathematical expression (4), for example. α of the mathematical expression (4) represents a coefficient which is empirically determined in advance.

[Expression 4]

$$di = \alpha Li \quad (4)$$

Subsequently, CPU 101 resets the threshold value for the re-calculated form exponent $S_n$ (step S111). A value which is empirically determined in advance may be used as the threshold value, and any numerical value input to the input frame 6 of GUI 2 of FIG. 2 may be used as the threshold value. The threshold value set in step S111 is referred to as the threshold value of the re-calculated form exponent $S_n$. CPU 101 holds the set threshold value of the re-calculated form exponent $S_n$ into the main memory 102. In this case, it is assumed that a value of "0.9" is input to the input frame 6 as shown in FIG. 2.

CPU 101 re-calculates the form exponent $S_n$ for each region extracted in step S108 by using the parameter di set in step S110 (step S112). Here, the form exponent $S_n$ is calculated according to the above mathematical expressions (1), (2) and (3). However, the parameter P1 contained in the mathematical expression (3) is assumed to be replaced by the reset parameter di.

Here, CPU 101 may execute expansion processing on each lesion candidate region extracted in step S108 and then re-calculate the form exponent $S_n$. The expansion processing is the processing of expanding the edge of the region i by the amount corresponding to one to several pixels. The region which has been subjected to the expansion processing is set as a calculation target of the form exponent $S_n$, whereby the form exponent $S_n$ can be re-calculated for even pixels which are excluded for a reason such as nonconformity of the parameter P1 or the like at the calculation stage (step S106) of the initial form exponent $S_0$, thereby enhancing the extraction precision. Not limited to the expansion processing, a region as a calculation target of the form exponent $S_n$ may be arbitrarily expanded.

CPU 101 executes threshold value processing on the form exponent $S_n$ calculated in step S112 by using the threshold value set in step S111, and extracts a region falling in the threshold value range (step S113).

Figure 9:
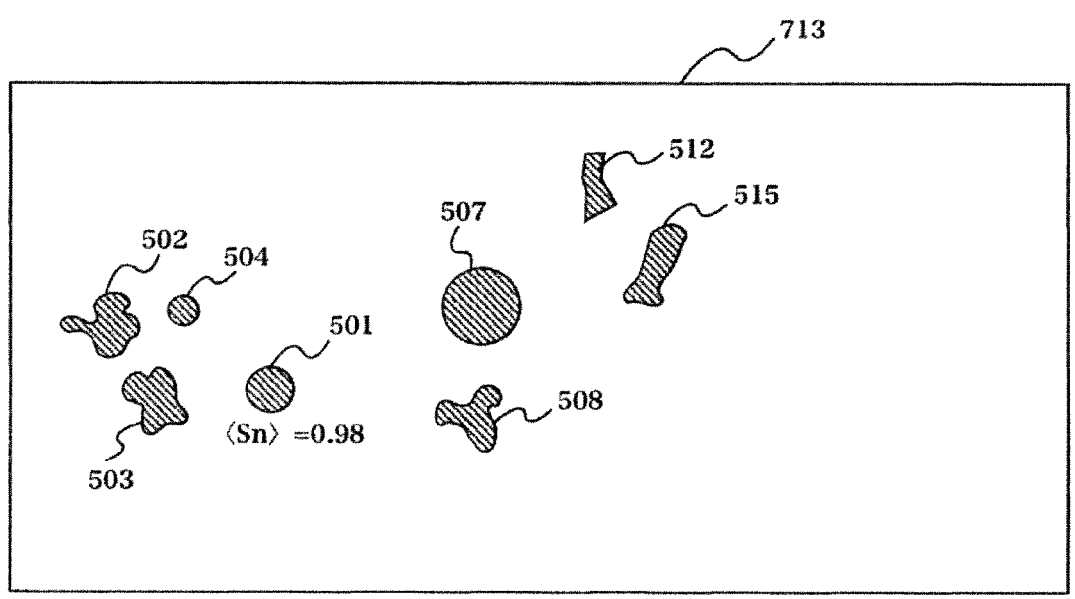
FIG. 9 is a diagram showing an example of a lesion candidate region extracted at the stage of step S113 of FIG. 3.

At this stage, some regions 501, 502, 503, 504, 507, 508, 512 and 515 are extracted in the panoramic image 713 like hatched regions of the image 713 of FIG. 9. In the case of the region 501 as an example, the average value $<S_n>$ of form exponents $S_n$ of respective pixels in the region 501 is corrected to "0.98" through the processing from step S110 to step S113. The average value $<S_0>$ of the initial form exponents $S_0$ of the respective pixels in the corresponding region 501 of FIG. 7 which are extracted at the stage before the processing from step S110 to step S113 is executed is equal to "0.75".

Figure 10:
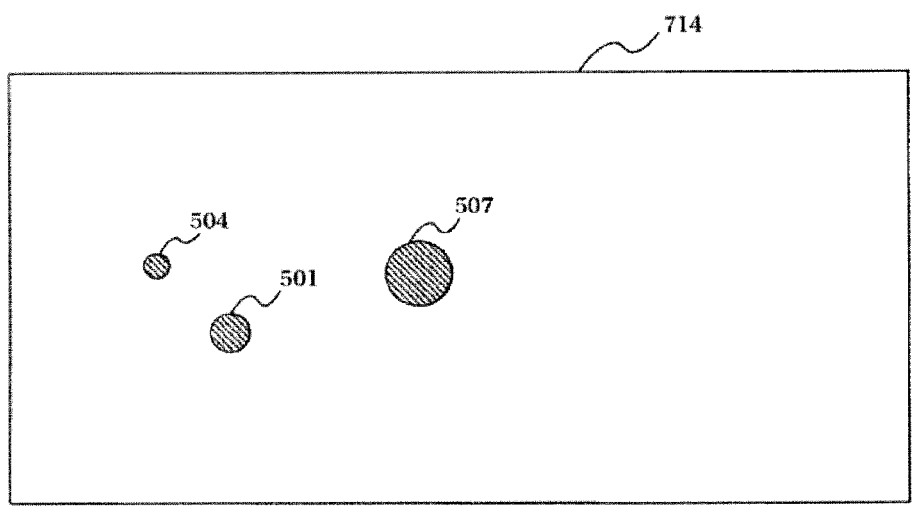
FIG. 10 is a diagram showing an example of a lesion candidate region extracted at the stage of step S114 of FIG. 3.

CPU 101 calculates various kinds of feature amounts such as the degree of circularity, a major-axis/minor-axis ratio, etc. of a region for each lesion candidate region extracted in step S113. With respect to the calculated feature amounts, only regions falling in the preset threshold value range are extracted, and false-positive regions are deleted (step S114). The lesion candidate regions 501, 504, 507 remaining at this stage are shown in FIG. 10.

CPU 101 re-calculates the region size Li for each lesion candidate region i extracted in step S114, and holds it into the main memory 102 (step S115). The region size Li is determined as in the case of the step S109.

The processing from steps S110 to S115 may be executed only once or repetitively executed at plural times. When the processing is repeated at plural times, as shown in step S116, CPU 101 compares the region size of the lesion candidate region re-extracted in the previous loop with the region size of the lesion candidate region re-extracted in the present loop, and shifts the processing to step S117 when the difference therebetween is equal to a predetermined value or less.

In step S117, CPU 101 creates a superimposed image 715 obtained by superimposing each lesion candidate region extracted in step S114 on the panoramic image 71 created in step S103. Each lesion candidate region of the superimposed image 715 is assumed to be supplied with a different color value in accordance with the value of the form exponent $S_n$ re-calculated in step S112 (step S117). CPU 101 displays the superimposed image 715 created in step S117 in the image display region 7 within GUI 2 displayed on the display device 107 (step S108).

For example, in the superimposed image 715, the re-extracted lesion candidate regions 501, 504, 507 are superimposed and displayed on the panoramic image 71 as shown in FIG. 11. The lesion candidate regions 501, 504 and 507 are different from one another in region size. However, the values of the re-calculated form exponents $S_n$ thereof are equal to the set threshold value or more (for example, "0.9" or more), and thus they have substantially similarity forms. Furthermore, it is assumed that the lesion candidate regions 501, 504 and 507 have substantially the same form exponent $S_n$ and thus are displayed with the same color.

In step S117, the lesion candidate regions in which color values are superimposed may be set to all the lesion candidate regions extracted in step S114 or to lesion candidate regions whose region sizes are equal to or more than a predetermined region size. The region size of the lesion candidate region to be displayed may be set in accordance with a value which is input to the input frame 8 of GUI 2 of FIG. 2 by an operator. In this case, CPU 101 refers to the region size Li calculated in step S115, supplies color values to the lesion candidate regions whose region sizes Li are equal to or larger than the region size input to the input frame 8, whereby they are superimposed and displayed.

A numeral value corresponding to a moving operation of the scroll bar 9 is input to the input frame 8 shown in GUI 2 of FIG. 2. In the example shown in FIG. 2, "6" mm is input to the input frame 8, and thus only the lesion candidate regions having the region sizes Li of 6 mm or more are selected, and superimposed and displayed.

The created superimposed image 715 may be displayed so as to be slidable at a predetermined feeding width in the core line direction of the hollow organ. In this case, CPU 101 may control the feeding width so as to reduce the feeding width to the next frame when a displayed frame (a part of the superimposed image) contains a lesion candidate region and increase the feeding width to the next frame when no lesion candidate region is contained.

For example, FIG. 12 is a diagram showing two slide-displayed continuous frames arranged in the vertical direction, wherein (A) shows a portion containing no lesion candidate region and (B) shows a portion containing a lesion candidate region.

When the slide-display feeding width at the portion containing no lesion candidate region is represented by A as shown in FIG. 12(A) and the slide-display feeding width at the portion containing the lesion candidate region is represented by Δ' as shown in FIG. 12(B), CPU 101 controls the feeding width so that Δ is larger than Δ' (Δ>Δ'). As described above, the slide-display is performed so that the feeding width at the portion containing the lesion candidate region is reduced, whereby more attention is paid to the portion containing the lesion candidate region.

As described above, in the image processing system 1 according to the first embodiment, the medical image processing device 100 executes the processing of extracting a lesion candidate region from a medical image (panoramic image 71). In the lesion candidate extraction processing, CPU 101 calculates the form exponent $S_0$ for each pixel of the overall panoramic image 71 by using an initial differential distance (parameter P1), and subjects the calculated form exponent $S_0$ to the threshold value processing to extract the lesion candidate region. Furthermore, CPU 101 makes an evaluation of the size of the lesion candidate region and the other feature amounts to thereby delete false-positive regions.

Thereafter, CPU 101 calculates the region size Li for each lesion candidate region, and resets the parameter di (differential distance) corresponding to the region size Li. Then, CPU 101 re-calculates the form exponent $S_n$ for each lesion candidate region by using the reset parameter di. Furthermore, CPU 101 executes the threshold value processing on the re-calculated form exponent $S_n$ and makes an evaluation of the size of the lesion candidate region and the other feature amounts, whereby the false-positive regions are deleted and the lesion candidate regions are re-extracted. Thereafter, CPU 101 superimposes and displays the re-extracted lesion candidate region on the panoramic image 71 in a display style (color value or the like) which is different every form exponent $S_n$.

Accordingly, the optimum differential distance di corresponding to the region size Li of the lesion candidate region is applied so that the form of each lesion candidate region can be estimated. Therefore, with respect to even lesion candidate regions having the same form and different sizes, the lesion candidate regions concerned can be extracted at a time through a series of processing, and superimposed and displayed on the panoramic image. Furthermore, they are superimposed and displayed in the display style (color value) or the like which is different in accordance with the form, and thus the lesion candidate regions can be displayed in the same display style even when they are different in size from one another, but they have the similarity form, so that the lesion candidates can be easily observed.

In the above example, the threshold value used in the threshold processing of the form exponents $S_0$, $S_n$ is set as the lower limit value. However, it may be set as the upper limit value or the range in accordance with the form to be extracted. Furthermore, in the false-positive deletion processing of steps S108 and S114, the major-axis/minor-axis ratio and the degree of circularity are estimated as feature amounts, however, the present invention is not limited to them. CT values, etc. of a region of interest may be set as feature amounts, and false-positive regions may be determined on the basis of these feature amounts.

Second Embodiment

Next, the image processing system 1 according to the second embodiment will be described. In the second embodiment, a method of extracting a lesion candidate region described with reference to the first embodiment is applied to a virtual endoscopic image. Furthermore, the hardware construction of the image processing system 1 according to the second embodiment is the same as the image processing system 1 according to the first embodiment of FIG. 1, and the description thereof is omitted. The same parts are represented by the same reference numerals.

The lesion candidate extraction processing executed in the medical image processing device 100 according to the second embodiment will be described.

Figure 13:
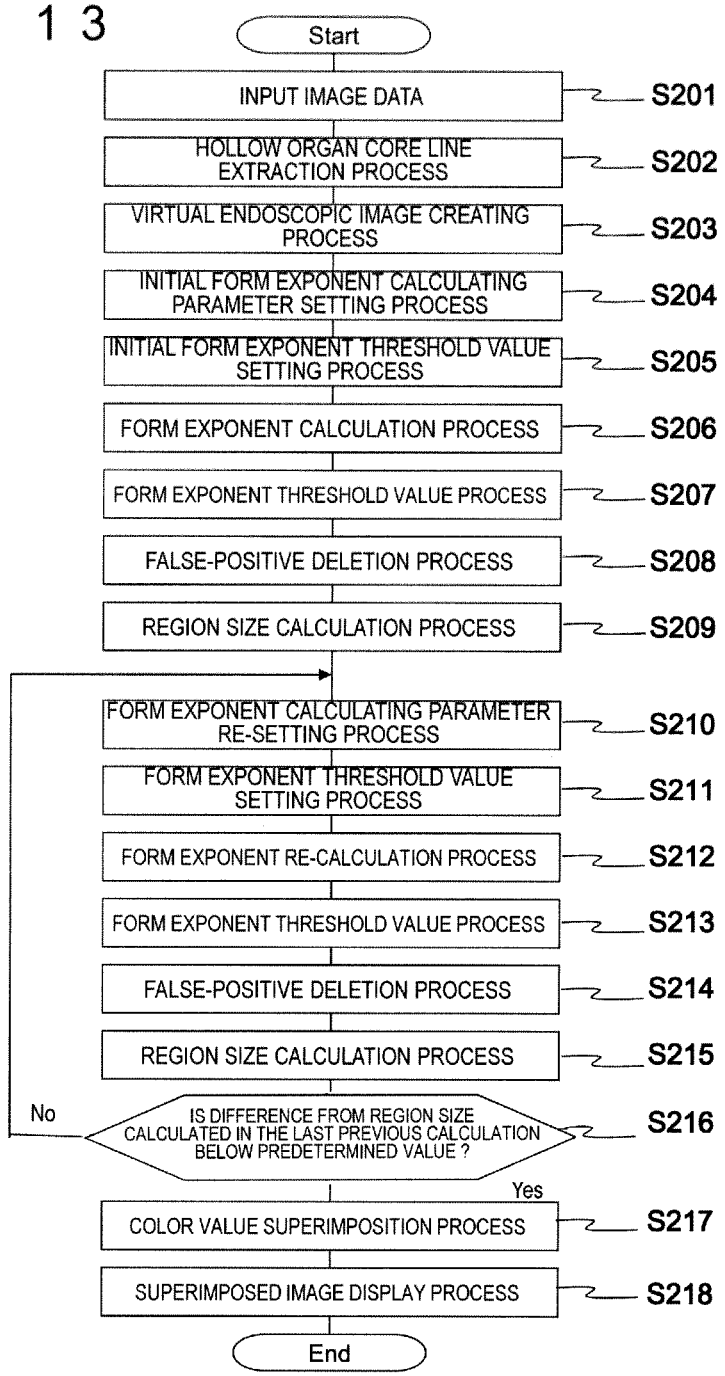
FIG. 13 is a flowchart showing the flow of lesion candidate extraction processing in a second embodiment.

CPU 101 of the medical image processing device 100 according to the second embodiment reads out a program and data concerning the lesion candidate extraction processing shown in FIG. 13 from the main memory 102, and executes the lesion candidate extraction processing on the basis of the program and the data.

In the lesion candidate extraction processing of FIG. 13, as in the case of the steps S101 to S102 of the lesion candidate extraction processing (FIG. 3) in the first embodiment, when the data read-in button 3 of GUI 2 of FIG. 2 is clicked, CPU 101 executes the read-in processing of image data. CPU 101 reads out the selected image data from the storage device 103 and holds the image data into the main memory 102 (step S201). Furthermore, CPU 101 extracts a core line from the read-in image data (step S202).

Subsequently, CPU 101 creates a display image by using the core line information extracted in step S202. In this case, it is assumed that a virtual endoscopic image 72 is created as a display image (step S203; see FIG. 18). The virtual endoscopic image 72 is defined as an image obtained when an aspect which is viewed from any viewing point set in a hollow organ region with some range of direction set as a visual field angle is projected onto a planar projection plane. The detailed creation of the virtual endoscopic image 72 is disclosed in Patent Document (JP-A-7-296184) or the like, and the description thereof is omitted.

CPU 101 sets the parameter P1 for calculating the initial form exponent $S_0$ for the virtual endoscopic image 72 created in step S203 (step S204). Here, as in the case of the step S104 of the first embodiment, the set parameter P1 is a differential distance for determining a different value at a point of interest, for example. A value which is empirically determined in advance may be used as the parameter P1, or any numerical value input to the input frame 4 of GUI 2 of FIG. 2 may be used as the parameter P1. CPU 101 stores the set parameter P1 into the main memory 102.

Subsequently, as in the case of the step S105 of the first embodiment, CPU 101 sets the initial form exponent threshold value (step S205).

CPU 101 calculates the form exponent $S_0$ for each pixel of the overall virtual endoscopic image 7 created in step S203 by using the differential distance (parameter P1) set in step S204 (step S206). A value represented by the above mathematical expression (1) is used as the initial form exponent $S_0$ as in the case of the first embodiment.

CPU 101 executes the threshold value processing on the form exponent $S_0$ calculated in step S206 by using the initial form exponent threshold value set in step S205, and extracts regions falling in the threshold value range (step S207).

Figure 14:
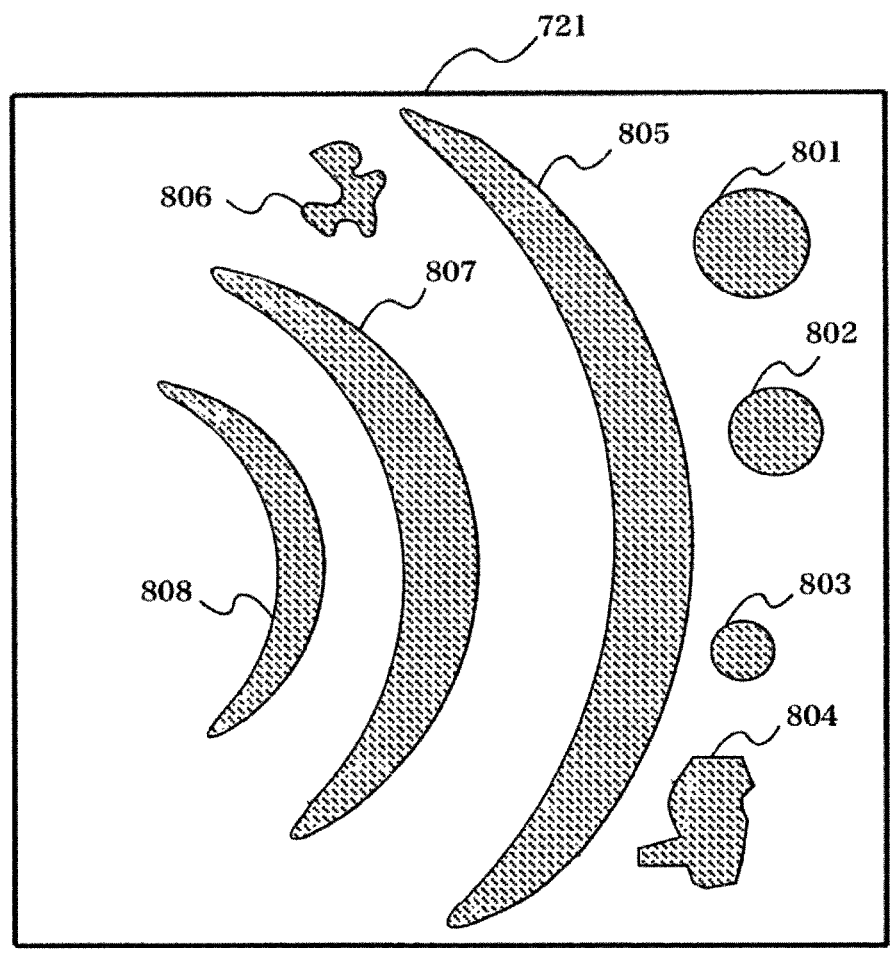
FIG. 14 is a diagram showing an example of a lesion candidate region extracted at the stage of step S207 of FIG. 13.

At this stage, some lesion candidate regions 801, 802, 803, . . . in the virtual endoscopic image 72 are extracted as shown in the image 721 of FIG. 14. CPU 101 calculates the various kinds of feature amounts such as the degree of circularity, the major-axis/minor-axis ratio, etc. of the region for each lesion candidate region extracted in step S207. With respect to the feature amounts, only the regions falling in the preset threshold value range are extracted, and false-positive regions are deleted (step S208). Lesion candidate regions 801, 802, 803, 804, 806 remaining at this stage are shown in FIG. 15.

In the example shown in FIG. 15, regions 801, 802, 803, 804 and 806 which are small in major-axis/minor-axis ratio and relatively near to a circle in form are extracted out of the regions shown in FIG. 14. For example, it is assumed that the average value $<S_0>$ of the initial form exponents $S_0$ of the respective pixels in the region 802 of FIG. 15 represents "0.75".

Subsequently, CPU 101 calculates the size (region size Li) for each region extracted in step S208 (step S209). The calculation of the region size Li is the same as the first embodiment. CPU 101 holds the region size Li calculated for each region into the main memory 102.

Subsequently, CPU 101 resets the parameter di of each lesion candidate region extracted in step S208 by using the region size Li calculated in step S209, and holds the parameter di into the main memory 102 (step S210). The parameter di is determined by using the above mathematical expression (4) as in the case of the first embodiment, and it is set to the value corresponding to the region size Li of each lesion candidate region i.

Subsequently, as in the case of the step S111 of the first embodiment, CPU 101 resets the threshold value for the re-calculated form exponent $S_n$ (step S211). Furthermore, as in the case of the step S112 of the first embodiment, CPU 101 re-calculates the form exponent $S_n$ for each region extracted in step S208 by using the parameter di set in the step S210 (step S212).

Furthermore, as in the case of the step S113 of the first embodiment, CPU 101 executes the threshold value processing on the form exponent $S_n$ re-calculated in step S212 by using the threshold value set in step S211, and extracts regions falling in the threshold range (step S213).

At this stage, some regions 801, 802, 803, 804 and 806 are extracted in the virtual endoscopic image 72 like hatched regions of the image 723 of FIG. 16. Taking the region 802 as an example, the average value $<S_n>$ of the form exponents $S_n$ of the respective pixels in the region 802 is corrected to "0.98" through the processing from step S210 to step S213. The average value $<S_0>$ of the initial form exponents $S_0$ of the respective pixels in the corresponding region 802 of FIG. 15, which is extracted at the stage before the processing from step S210 to step S213, is equal to "0.75".

Figure 17:
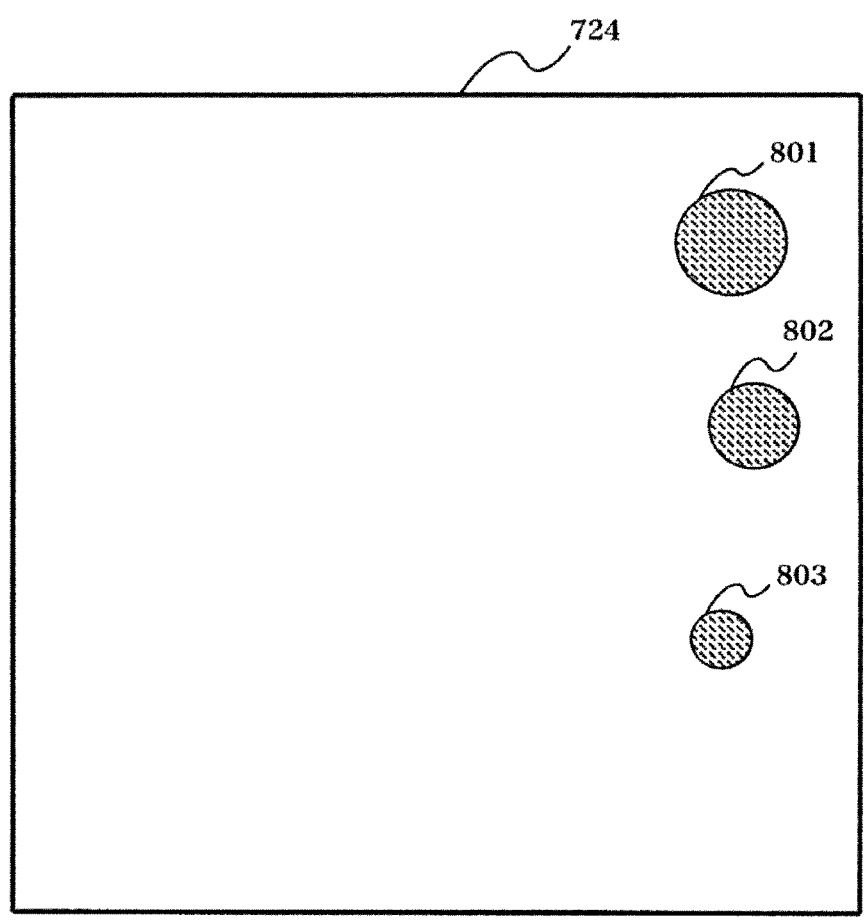
FIG. 17 is a diagram showing an example of a lesion candidate region extracted at the stage of step S214 of FIG. 13.

As in the case of the step S114 of the first embodiment, CPU 101 calculates the various kinds of feature amounts of a region such as the degree of circularity, the major-axis/minor-axis ratio, etc. for each region extracted in step S213. With respect to the calculated feature amounts, only regions falling in the preset threshold value range are extracted, and false-positive regions are deleted (step S214). The regions 801, 802 and 803 remaining at this stage are shown in FIG. 17.

CPU 101 re-calculates the region size Li for each lesion candidate region i re-extracted in step S214. The region size Li is determined as in the case of the step S209.

As in the case of the first embodiment, the processing of steps S210 to S215 may be executed only once or repeated at plural times. When it is repeated at plural times, as indicated in the step S216, the region size of the lesion candidate region re-extracted in the previous loop is compared with the region size of the lesion candidate region re-extracted in the present loop, and when the difference therebetween is equal to a predetermined value or less, the processing shifts to step S217.

In step S217, CPU 101 creates a superimposed image 725 obtained by superimposing each lesion candidate region extracted in step S214 on the virtual endoscopic image 72 created in step S203. It is assumed that a color value which is different in accordance with the value of the form exponent $S_n$ re-calculated in step S212 is given to each lesion candidate region of the superimposed image 725 (step S217). Then, CPU 101 displays the superimposed image 725 created in step S217 on the image display region 7 in GUI 2 (step S218).

Figure 18:
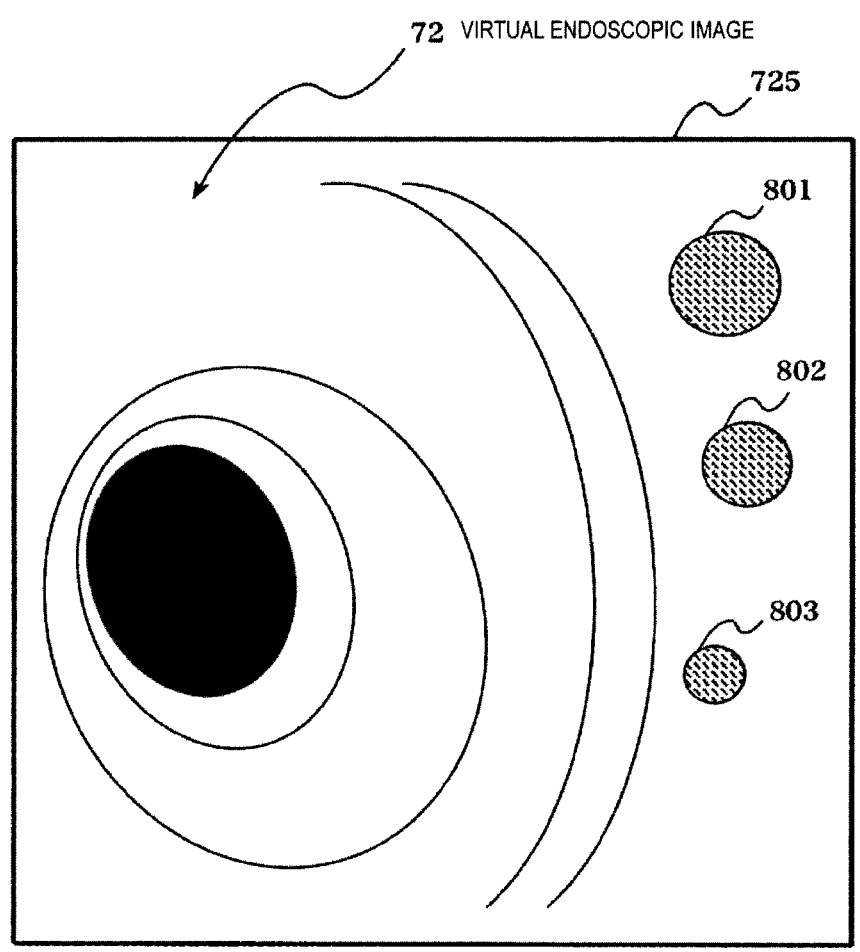
FIG. 18 shows an example of a superimposed image obtained by superimposing a lesion candidate region on a virtual endoscopic image.

For example, in the superimposed image 725, the re-extracted lesion candidate regions 801, 802 and 803 are displayed on the virtual endoscopic image 72 as shown in FIG. 18. The lesion candidate regions 801, 802 and 803 are different in region size, however, the values of the re-calculated form exponents $S_n$ thereof are equal to a set threshold value or more (for example, "0.9" or more), so that they have substantially similarity forms. Furthermore, the lesion candidate regions 801, 802 and 803 have substantially the same form, and thus they are displayed with the same color.

As in the case of the first embodiment, in step S217, the lesion candidate regions on which the color values are superimposed may be applied to all the lesion candidate regions extracted in step S214. However, they may be applied to only regions having a predetermined region size or more out of the above lesion candidate regions.

Furthermore, as in the case of the first embodiment, the created superimposed image 725 may be slide-displayed at a predetermined feeding width in the core line direction of the hollow organ. In this case, CPU 101 may control the feeding width so that the feeding width to the next frame is reduced when the displayed frame (a part of the superimposed image) contains a lesion candidate region, and the feeding width to the next frame is increased when the displayed frame contains no lesion candidate region.

Figure 19:
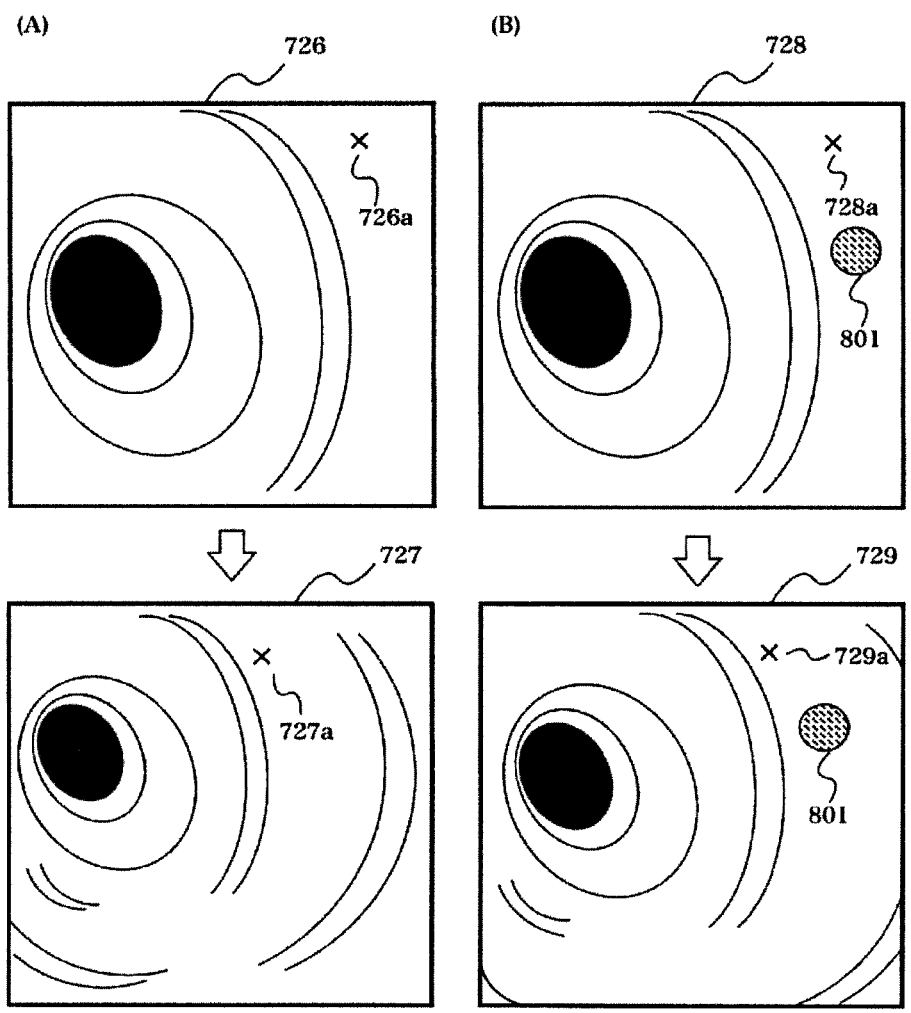
FIG. 19 is a diagram showing a slide display in a hollow organ core line direction.

For example, FIG. 19 is a diagram showing two slide-displayed continuous frames, wherein (A) shows a portion containing no lesion candidate region, and (B) shows a portion containing a lesion candidate region.

As shown in FIG. 19(A), the corresponding points of the continuous frames 726 and 727 containing no lesion candidate region are represented by 726a, 727a. Furthermore, as shown in FIG. 19(B), the corresponding points of the continuous frames 728, 729 containing a lesion candidate region are represented by 728a, 729a. In this case, CPU 101 controls to increase the movement amount of a viewing point more greatly at the portion containing no lesion candidate region of FIG. 19(A) as compared with the portion containing a lesion candidate region of FIG. 19(B). As described above, the slide-display is executed while the feeding width of the portion containing the lesion candidate region is reduced, whereby more attention is paid to the portion containing the lesion candidate region.

As described above, according to the second embodiment, the same processing as the first embodiment (extraction of the lesion candidate region from the panoramic image) is executed on the virtual endoscopic image 72.

Accordingly, with respect to even the virtual endoscopic image, lesion candidate regions which have the same form and different sizes can be extracted at a time through a series of processing, and superimposed and displayed.

Third Embodiment

Next, the image processing system 1 according to a third embodiment will be described. The hardware construction of the image processing system 1 according to the third embodiment is the same as the image processing system 1 according to the first embodiment of FIG. 1, and thus the description thereof is omitted. The same parts are represented by the same reference numerals and described.

In the third embodiment, the lesion candidate regions extracted from the panoramic image 71 in the lesion candidate extracting processing (the steps S101 to S117 of FIG. 3) of the first embodiment are reflected to the virtual endoscopic image 72.

The image processing system 1 according to the third embodiment will be described hereunder with reference to FIGS. 20 and 21.

Figure 20:
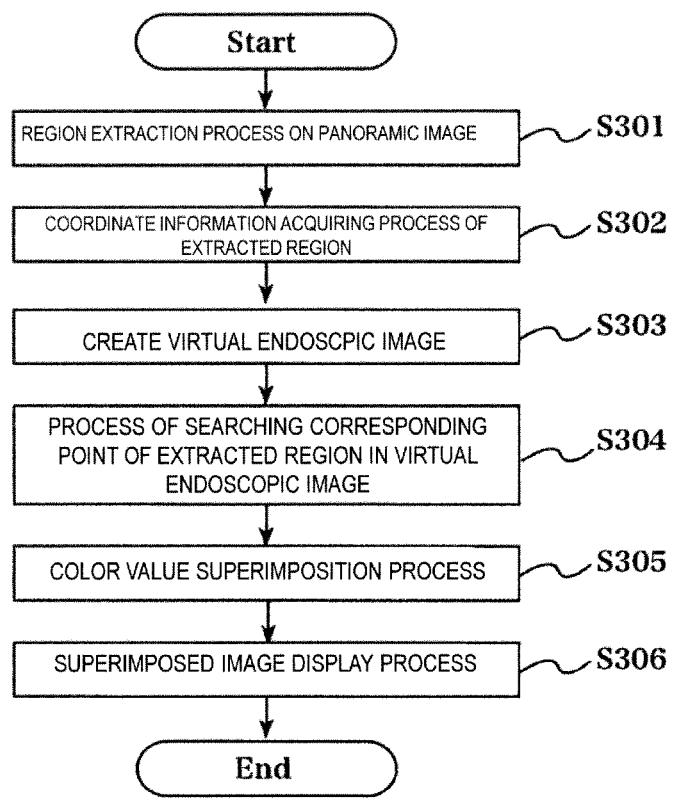
FIG. 20 is a flowchart showing the flow of display processing according to a third embodiment.

In the display processing of the third embodiment shown in FIG. 20, CPU 101 first extracts a lesion candidate region from a panoramic image 71 in the steps S101 to S116 of the lesion candidate extraction processing of FIG. 3, and also stores a re-calculated form exponent $S_n$ (step S112 of FIG. 3) into the main memory 102 (step S301). The color value superimposition processing of the step S117 and the superimposition image display processing of the step S118 in FIG. 3 may be omitted.

Furthermore, CPU 101 acquires, for example, coordinate information such as a real space coordinate or the like for the lesion candidate region extracted in step S301 and holds it into the main memory 102 (step S302).

Subsequently, CPU 101 creates the virtual endoscopic image 72 according to the processing of the steps S201 to S203 of FIG. 13 (step S303). Then, CPU 101 determines whether the coordinate corresponding to the coordinate information obtained in step S302 (the real space coordinate of the lesion candidate region extracted from the panoramic image 71) is contained in the real space coordinate of the inner wall displayed on the virtual endoscopic image 72 created in step S303 (step S304).

When it is determined in step S304 that the coordinate corresponding to the coordinate information (lesion candidate region) obtained in step S302 is contained in the real space coordinate of the inner wall displayed on the virtual endoscopic image 72, CPU 101 creates a superimposed image 732 superimposed with the color value representing the lesion candidate region (see FIG. 21) at the corresponding coordinate of the inner wall of the virtual endoscopic image 72. Here, the color value representing the lesion candidate region is set to the color value corresponding to the form exponent $S_n$ of each region stored in the main memory 102 in step S301 (step S305).

CPU 101 displays the superimposed image 732 created in step S305 in the image display region 7 in the GUI 2 shown in FIG. 2 (step S306). Here, it is desired that both the superimposed image 731 onto the panoramic image 71 and the superimposed image 732 onto the virtual endoscopic image 72 are displayed in the image display region 7. When both the superimposed image 731 onto the panoramic image 71 and the superimposed image 732 onto the virtual endoscopic image 72 are displayed, the comparison of the lesion candidates can be easily performed, and thus reading can be further efficiently performed.

When the real space coordinates corresponding to 501a, 507a in the lesion candidate regions 501a, 504a, 507a in the superimposed image 731 in the panoramic image 71 are within the virtual endoscopic image 72 as shown in FIG. 21, the corresponding regions 501b, 507b are displayed at the corresponding coordinate positions.

As described above, according to the third embodiment, the image processing device 100 superimposes and displays the lesion candidate region extracted in the panoramic image 71 at the corresponding position of the virtual endoscopic image 72. As a result, the comparison reading of the lesion candidate region between the panoramic image 71 and the virtual endoscopic image 72 can be easily performed and thus the diagnosis efficiency is enhanced.

As in the case of the first and second embodiments, in the step S305, all the lesion candidate regions extracted in step S301 or only the lesion candidate regions having larger region sizes than a predetermined region size may be set as the lesion candidate regions on which the color values are superimposed. Furthermore, in the third embodiment, the lesion candidate region extracted from the panoramic image 71 is reflected to the virtual endoscopic image 72. However, conversely, the lesion candidate region extracted from the virtual endoscopic image 72 may be reflected to the panoramic image 71, or the lesion candidate region extracted from the panoramic image 71 or the virtual endoscopic image 72 may be reflected to the medical tomographic image.

Fourth Embodiment

In a fourth embodiment, various display styles of the lesion candidate region extracted according to the methods described with reference to the first to third embodiments will be described.

Figure 22:
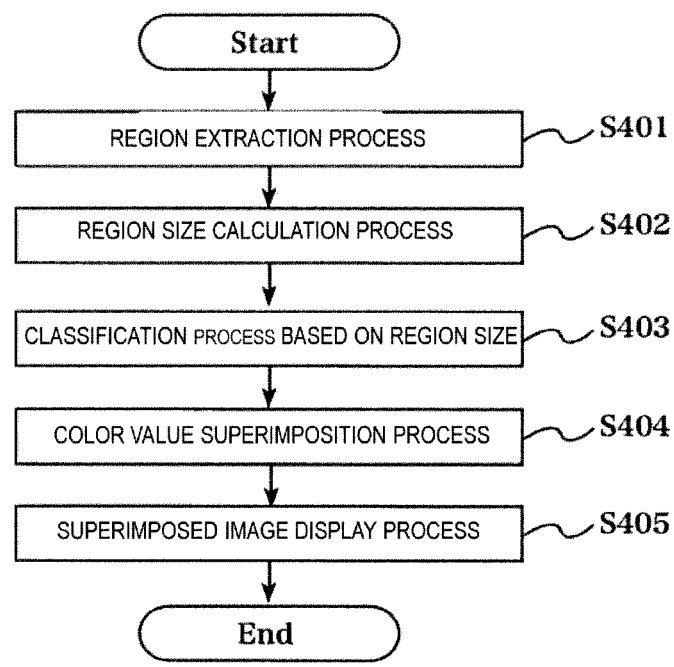
FIG. 22 is a flowchart showing the flow of display processing according to a fourth embodiment.

As shown in FIG. 22, CPU 101 first extracts the lesion candidate region from the panoramic image 71 or the virtual endoscopic image 72 (step S401). The extraction of the lesion candidate region is the same as the processing of the steps S101 to S116 of FIG. 3 or the steps S201 to S216 of FIG. 13, and the description thereof is omitted.

Subsequently, CPU 101 calculates the region size Li for each lesion candidate region i extracted in step S401 (step S402). The calculation of the region size Li is the same as the step S109 of FIG. 3, the step S209 of FIG. 13 or the like. CPU 101 classifies the respective regions i into plural classes such as three stages or the like on the basis of the region size Li calculated in the step S402 (step S403).

CPU 101 creates a superimposed image in the display style (for example, color value, transparency, pattern or the like) corresponding to a class in which each lesion candidate region extracted in step S401 is classified in step S403 (step S404), and displays the created superimposed image on the display screen (step S405).

As the display style corresponding to the classified class, for example, with respect to lesion candidate regions 501c, 504c, 507c belonging to different classes displayed on the panoramic image 741 and lesion candidate regions 801c, 802c, 803c belonging to different classes displayed on the virtual endoscopic image 742, the lesion candidate regions having different region sizes are displayed with different colors, for example, like red, blue and yellow as shown in FIG. 23. In such a case, an indication such as the degree of risk or the like which is estimated form the region size can be easily determined.

Furthermore, as indicated by 501d, 504d, 507d, 801d, 802d, 803d of FIG. 24, colors such as red, blue, yellow which are allocated every class may be applied to only the edges of the respective lesion candidate regions. When only the edges of the regions are colored as described above, the surface state of the lesion candidate region can be observed.

As indicated by 501e, 504e, 507e, 801e, 802e, 803e of FIG. 25, the transparency of coloring may be varied every class. For example, classes in such a level that a lesion candidate region has a large region size and thus overlooking causes a risk is colored with an opaque color so as to make it conspicuous. With respect to classes which have small sizes and thus have a small degree of risk, the transparency is increased or the like. When the transparency is varied every class as described above, more attention is paid to a region having a large size and thus a large degree of risk.

As described above, in the image processing system 1 according to the fourth embodiment, the lesion candidate regions extracted from the medical image are classified into plural classes on the basis of the region size, and they are displayed on the medical image in different display styles in accordance with the classified classes. As a result, the degree of risk of lesion can be easily determined on the basis of the difference in display style.

In the fourth embodiment, the grouping (classification) based on the region size of the lesion candidate region is executed, however, this embodiment is not limited to this classification. For example, classification based on the form such as the form exponent or the like, or classification based on other feature amounts may be adopted. Furthermore, in the first to fourth embodiments, extraction of a lesion candidate region on the inner wall of a colon has been described. However, not only other hollow organs such as bronchial tubes, blood vessels, small intestine, etc., but also digestive organs such as stomach, etc., prominences at the outside of hollow organs such as aneurysm, etc. may be targeted.

The method described with reference to the first to fourth embodiments may be arbitrarily combined. Furthermore, it is apparent that various modifications or alterations may be made by persons skilled in the art within the scope of the technical idea disclosed in this application, and it is understood that they belong to the technical scope of this invention.

DESCRIPTION OF REFERENCE NUMERALS 1 image processing system, 100 medical image processing device, 101 CPU 101, 102 main memory, 103 storage device, 104 communication IF, 105 display memory, 106 I/F, 107 display device, 108 mouse (external equipment), 109 input device, 110 network, 111 image data base, 112 medical image scanning device, 2 GUI, 4 initial differential distance input frame, 5 initial form exponent threshold value input frame, 6 form exponent threshold value input frame, 7 image display region, 8 size input frame, 9 scroll bar, 71 panoramic image, 715 superimposed image onto panoramic image, 501 to 515 lesion candidate region, 72 virtual endoscopic image, 725 superimposed image onto virtual endoscopic image, 801 to 808 lesion candidate region

The invention claimed is:

1. A medical image processing device for extracting from a medical image, and displaying, lesion candidate regions on a surface of an organ, the medical image processing device comprising:
   a first extracting unit that makes a first evaluation of a curved surface form of the organ by using an initial parameter, and extracts first lesion candidate regions from volume image data based on the first evaluation;
   a second extracting unit that makes a second evaluation of a curved surface form of the organ by using a parameter reset based on a region size of each of the first lesion candidate regions, and re-extracts second lesion candidate regions from volume image data based on the second evaluation; and
   a display unit that superimposes and displays the second lesion candidate regions extracted by the second extracting unit on a second medical image.

2. The medical image processing device according to claim 1, characterized in that the first extracting unit and the second extracting unit make the first evaluation and the second evaluation by using a form exponent for estimating a state of the curved surface form.

3. The medical image processing device according to claim 2, characterized in that the first extracting unit and the second extracting unit calculate the form exponent by using a predetermined parameter.

4. The medical image processing device according to claim 3, characterized in that the form exponent is Shape Index, and the predetermined parameter is a differential distance for determining a differential value at a point of interest.

5. The medical image processing device according to claim 3, characterized in that the second extracting unit calculates the form exponent by using a differential distance corresponding to a region size of each of the first lesion candidate regions.

6. The medical image processing device according to claim 1, characterized in that the first extracting unit and the second extracting unit calculate a predetermined feature amount for the extracted lesion candidate regions, and by extracting regions in which the calculated feature amount falls into a predetermined threshold value range, delete a false-positive region from the extracted lesion candidate regions.

7. The medical image processing device according to claim 6, characterized in that the second extracting unit executes expansion processing on regions obtained by deleting the false-positive region from the first lesion candidate regions to make the second evaluation.

8. The medical image processing device according to claim 1, characterized in that the first medical image and the second medical image are panoramic images of a hollow organ region created by using volume image data.

9. The medical image processing device according to claim 1, characterized in that the first medical image and the second medical image are virtual endoscopic images of a hollow organ region created by using volume image data.

10. The medical image processing device according to claim 1, characterized in that the first medical image is a panoramic image of a hollow organ region created by using volume image data, and the second medical image is a virtual endoscopic image of the hollow organ region created by using the volume image data.

11. The medical image processing device according to claim 1, characterized in that the display unit further superimposes and displays the second lesion candidate regions extracted by the second extracting unit on the second medical image in a display style corresponding to a form of the second lesion candidate region.

12. The medical image processing device according to claim 1, characterized in that the display unit further superimposes and displays the second lesion candidate regions extracted by the second extracting unit on the second medical image in a display style corresponding to a region size of the second lesion candidate region.

13. The medical image processing device according to claim 1, further comprising an specifying unit that specifies a range concerning the region size of the lesion candidate region to be superimposed and displayed on the second medical image, wherein the display unit further superimposes and displays, on the second medical image, a second lesion candidate region having a region size within the range specified by the specifying unit out of the second lesion candidate regions extracted by the second extracting unit.

14. A medical image processing method for extracting from a medical image, and displaying, lesion candidate regions on a surface of an organ, the medical image processing method comprising:
   a first extracting step that makes a first evaluation of a curved surface form of the organ by using an initial parameter, and extracts first lesion candidate regions from volume image data based on the first evaluation;
   a second extracting step that makes a second evaluation of a curved surface form of the organ by using a parameter reset based on a region size of each of the first lesion candidate regions, and re-extracts second lesion candidate regions from volume image data based on the second evaluation; and
   a display step that superimposes and displays the second lesion candidate regions, extracted in the second extraction step, on a second medical image.

15. The medical image processing method according to claim 14, characterized in that the display step further superimposes and displays the second lesion candidate regions extracted by the second extracting step in a display style corresponding to a form or region size of the second lesion candidate.

* * * * *